United States Patent
Hartman et al.

(10) Patent No.: US 6,725,208 B1
(45) Date of Patent: Apr. 20, 2004

(54) BAYESIAN NEURAL NETWORKS FOR OPTIMIZATION AND CONTROL

(75) Inventors: Eric Jon Hartman, Austin, TX (US); Carsten Peterson, Lund (SE); Stephen Piche, Austin, TX (US)

(73) Assignee: Pavilion Technologies, Inc., Austin, TX (US)

( * ) Notice: Subject to any disclaimer, the term of this patent is extended or adjusted under 35 U.S.C. 154(b) by 0 days.

(21) Appl. No.: 09/290,791

(22) Filed: Apr. 12, 1999

Related U.S. Application Data

(60) Provisional application No. 60/103,269, filed on Oct. 6, 1998.

(51) Int. Cl.[7] .................. G06F 15/18; G06F 19/00; G05B 13/02
(52) U.S. Cl. .................. 706/23; 706/21; 706/906; 706/914; 700/49; 700/104
(58) Field of Search .................. 706/21, 15, 23, 706/902–904, 906, 907, 911, 912, 914, 915, 16; 700/44, 45, 29, 30, 48, 51, 104, 49

(56) References Cited

U.S. PATENT DOCUMENTS

| | | | | |
|---|---|---|---|---|
| 4,992,942 A | * | 2/1991 | Bauerle et al. | 700/284 |
| 5,023,045 A | * | 6/1991 | Watanabe et al. | 376/215 |
| 5,159,660 A | * | 10/1992 | Lu et al. | 706/23 |
| 5,465,321 A | * | 11/1995 | Smyth | 706/20 |
| 5,513,097 A | * | 4/1996 | Gramckow et al. | 700/48 |
| 5,586,221 A | * | 12/1996 | Isik et al. | 706/23 |
| 5,659,667 A | * | 8/1997 | Buescher et al. | 706/23 |
| 5,680,513 A | * | 10/1997 | Hyland et al. | 706/23 |
| 5,781,432 A | * | 7/1998 | Keeler et al. | 700/44 |
| 5,796,920 A | * | 8/1998 | Hyland | 706/20 |
| 5,825,646 A | * | 10/1998 | Keeler et al. | |
| 5,867,386 A | * | 2/1999 | Hoffberg et al. | 700/83 |
| 5,877,954 A | * | 3/1999 | Klimasauskas et al. | 700/29 |
| 5,901,246 A | * | 5/1999 | Hoffberg et al. | 382/209 |
| 5,933,345 A | | 8/1999 | Martin et al. | 700/44 |
| 6,185,470 B1 | * | 2/2001 | Pado et al. | 700/104 |
| 6,212,438 B1 | * | 4/2001 | Reine | 700/48 |
| 6,216,048 B1 | * | 4/2001 | Keeler et al. | 700/44 |
| 6,278,899 B1 | * | 8/2001 | Piche et al. | 700/44 |
| 6,353,766 B1 | * | 3/2002 | Weinzierl | 700/28 |
| 6,363,289 B1 | * | 3/2002 | Keeler et al. | 700/48 |
| 6,381,504 B1 | * | 4/2002 | Havener et al. | 700/44 |
| 6,438,430 B1 | * | 8/2002 | Martin et al. | 700/28 |
| 6,438,534 B1 | * | 8/2002 | Sorgel | 706/61 |

OTHER PUBLICATIONS

Carson et al.; "Simulation Optimization: Methods and Applications". Proceedings of the 1997 Winter Simulation Conference, winter 1997, pp. 118–126.*

Lei, X.; "Bayesian Ying–Yang System and Theory as a Unified Statistical Learning Approach:(IV) Further Advances". The 1998 IEEE International Joint Conference on Neural Networks Proceedings, vol. 2, May 1998, pp. 1275–1280.*

(List continued on next page.)

Primary Examiner—Wilbert L. Starks, Jr.
Assistant Examiner—Kevin Booker
(74) Attorney, Agent, or Firm—Howison & Arnott, L.L.P.

(57) ABSTRACT

An optimization system is provided utilizing a Bayesian neural network calculation of a derivative wherein an output is optimized with respect to an input utilizing a stochastical method that averages over many regression models. This is done such that constraints from first principal models are incorporated in terms of prior art distributions.

80 Claims, 7 Drawing Sheets

OTHER PUBLICATIONS

Yamamura et al.; "Reinforcement Learning with Knowledge by Using a Stochastic Gradient Method on a Bayesian Network". The 1998 IEEE International Joint Conference on Neural Networks Proceedings, vol. 3, May 1998, pp. 2045–2050.*

Piche, S.; "Robustness of Feedforward Neural Networks". International Joint Conference on Neural Networks, vol. 2, Jun. 1992, pp. 346–351.*

Piche, S.; "Steepest Descent Algorithms for Neural Network Controllers and Filters". IEEE Transactions on Neural Networks, vol. 5, No. 2, Mar. 1994, pp. 198–212.*

Andrieu et al.; "Bayesian Blind Marginal Separation of Convolutively Mixed Discrete Sources". Proceedings of the 1998 IEEE Signal Processing Society Workshop, Aug. 1998, pp. 43–52.*

Dong et al.; "A Self–Organizing Reasoning Neural Network". 1994 IEEE International Conference on Neural Networks, vol. 3, Jun. 1994, pp., 1542–1545.*

Alhakeem et al.; "Decentralized Bayesian Detection with Feedback". IEEE Transactions on Systems, Man and Cybernetics, vol. 26, Iss. 4, Jul. 1996, pp. 503–513.*

Cox et al.; "An Optimized Interaction Strategy for Bayesian Relevance Feedback". 1998 IEEE Computer Society Conference on Computer Vision and Pattern Recognition, Jun. 1998, pp. 553–558.*

Hartman et al.; "Semi–local Units for Prediction", IJCNN–91–Seattle International Joint Conference on Neural Networks, Jul. 1991, vol. 2, pp. 561–566.*

Piche, S.W.; "The Second Derivative of a Recurrent Network". IEEE World Congress on Computational Intelligence, vol. 1, Jun. 1994, pp. 245–250.*

Lasdon, Leon; "Optimization Tutorial," College of Business Administration, University of Texas, Austin; Jun., 1995.

Stuart Smith, Leon Lasdon; "Solving Large Sparse Nonlinear Programs Using GRG," ORSA Journal on Computing, vol. 4, No. 1, Winter 1992, pp. 1–15.

Jeong–Woo Lee and Jun–Ho Oh; "Hybrid Learning of Mapping and Its Jacobian in Multilayer Neural Networks," Neural Computation 9, 1997 Massachusetts Institute of Technology, pp. 937–958.

Jouko Lampinen and Arto Selonen; "Multilayer Perceptron Training with Inaccurate Derivative Information," Proc. 1995 IEEE International Conference on neural Networks ICNN '95, Perth, WA, vol. 5, pp. 2811–2815, 1995.

T. P. Vogl, J. K. Mangis, A. K. Rigler, W. T. Zing, and D. L. Alkon; "Accelerating the Convergence of the Back–Propagation Method," Biological Cybernetics, 59, pp. 275–263, 1988.

Kurt Hornik; "Multilayer Feedforward Networks are Universal Approximators," Neural Networks, vol. 2, pp. 359–366, 1989.

* cited by examiner

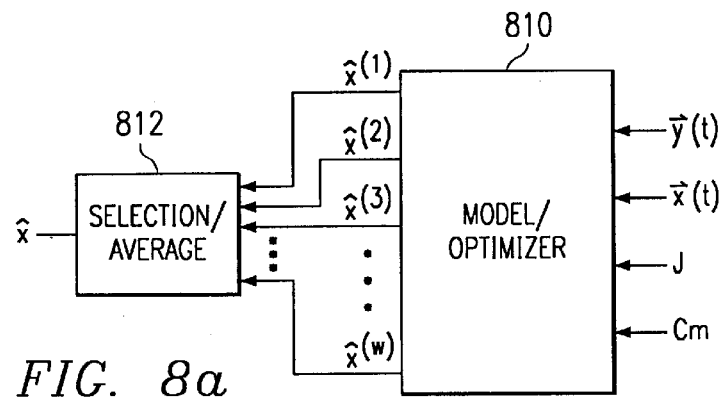
*FIG. 8a*
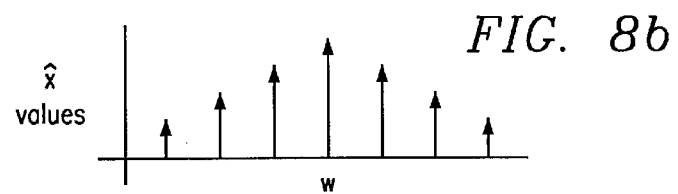
*FIG. 8b*
*FIG. 11*
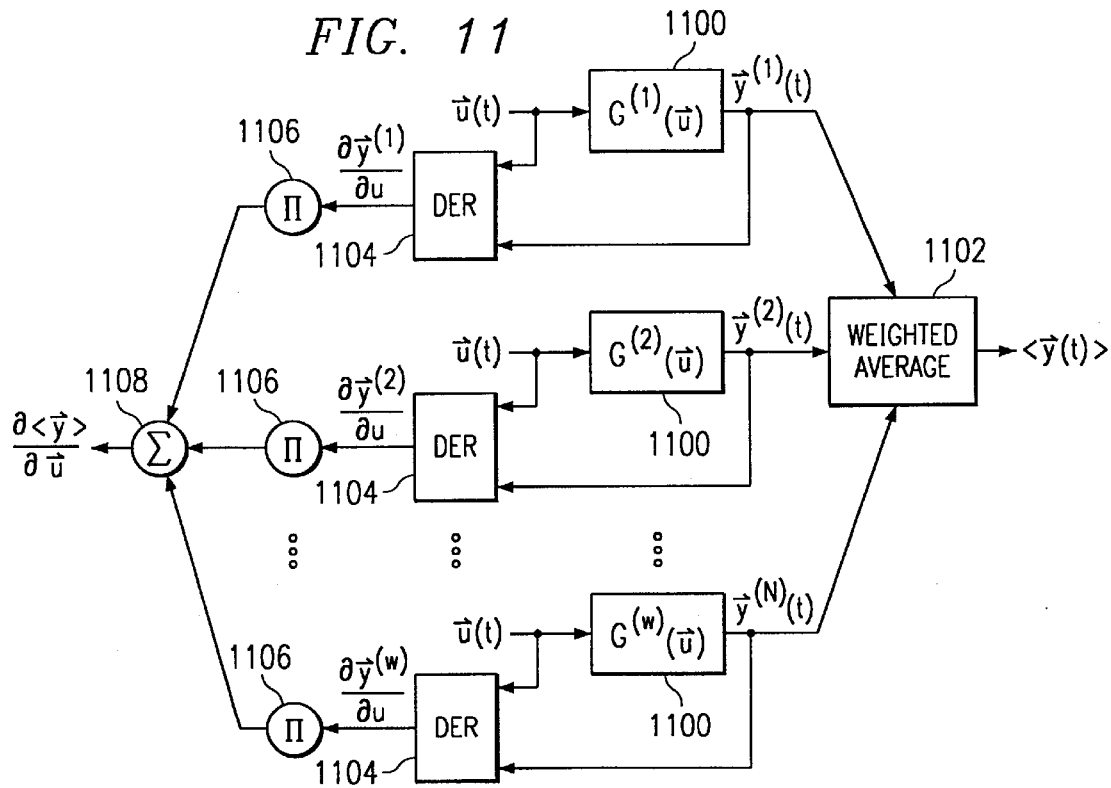

BAYESIAN NEURAL NETWORKS FOR OPTIMIZATION AND CONTROL

CROSS REFERENCE TO THE RELATED APPLICATION

The present application is a Continuation-in-Part of, and claims priority in, U.S. Provisional Patent Application Serial No. 60/103,269, entitled Bayesian Neural Networks For Optimization and Control, and filed Oct. 6, 1998.

TECHNICAL FIELD OF THE INVENTION

The present invention pertains in general to neural networks for use with optimization of plants and, more particularly, to the use of Bayesian-trained neural networks for optimization and control.

BACKGROUND OF THE INVENTION

In general, modeling techniques for a plant involve the generation of some type of model. This is typically done utilizing a single model, either a linear model or a non-linear model. However, another technique of generating a model is to utilize a plurality of models that can be utilized to define a predicted vector output y(t) of values $y_1(t), y_2(t), \ldots, y_q(t)$ as a function of an input vector x(t) of values $x_1(t), x_2(t), \ldots, x_p(t)$. For the purposes of this application, a vector in the text shall be defined in bold and in equation form shall be defined with an overstrike arrow.

Given a set n of measured process data points:

$$D=(\vec{x}_1, \vec{y}_1)=(\vec{x}^{(1)}, \vec{y}^{(1)}), (\vec{x}^{(2)}, \vec{y}^{(2)}), \ldots, (\vec{x}^{(n)}, \vec{y}^{(n)}) \quad (1)$$

and assuming that an underlying mapping exists with the following relationship:

$$\vec{y} = F(\vec{x}) \quad (2)$$

exists, a stochastical method for generating y(t) with respect to x(t) can be defined by averaging over many (non-linear) regression models $F^{(w)}$. Given x(t), Fx(t) is approximated via a stochastic neural network training algorithm (non-linear regression) to the set of functions $F^{(w)}x(t)$, with "w" being the index for the number of models, by fitting to the dataset (x(t), y(t)) in the dataset D. However, this only provides a forward predictive model and does not facilitate the use thereof for optimization or control purposes.

SUMMARY OF THE INVENTION

The present invention disclosed and claimed herein comprises a method for optimizing a system in which a plant is provided for optimization. A training network having an input layer for receiving inputs to the plant, an output layer for outputting predicted outputs, and a hidden layer for storing a learned representation of the plant for mapping the input layer to the output layer is also provided. A method for training the neural network in utilizing the stochastical method of a Bayesian-type is provided.

In another aspect of the present invention, a method utilizing the network in an optimization mode in feedback from the output of the plant to the input of the plant to optimize the output with respect to the input via the stochastical Bayesian method is provided.

BRIEF DESCRIPTION OF THE DRAWINGS

For a more complete understanding of the present invention and the advantages thereof, reference is now made to the following description taken in conjunction with the accompanying Drawings in which:

FIG. 8a illustrates a block diagram of a simplified embodiment of FIG. 8;

FIG. 8b illustrates a distribution plot of the estimated x(t) values;

FIGS. 11 and 12 illustrate block diagrams of an the implementation of the network for a dynamic model;

DETAILED DISCLOSURE OF THE INVENTION

Figure 1:
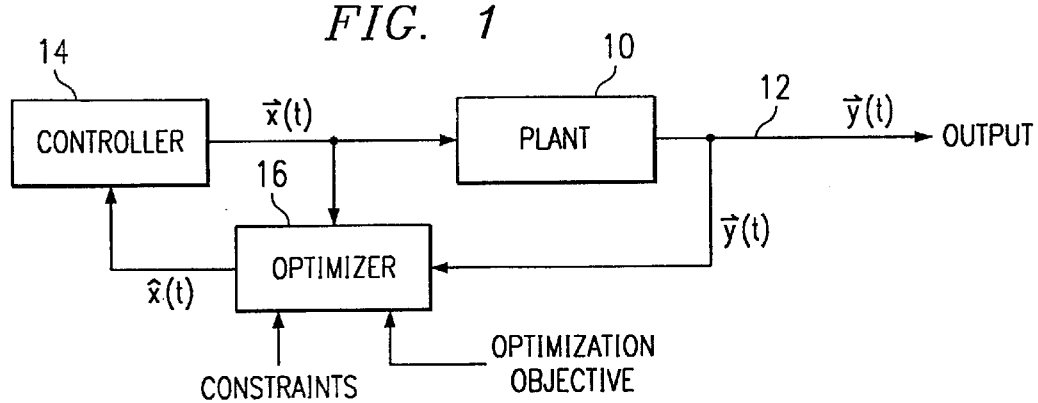
FIG. 1 illustrates a block diagram of the present invention utilizing the optimizer of the disclosed embodiment.

Referring now to FIG. 1, there is illustrated a block diagram of the system of the disclosed embodiment for optimizing/controlling the operation of a plant. A plant 10 is illustrated having a vector input x(t) and a vector output y(t). The plant 10 is operable to receive the inputs x(t), perform the process and generate the outputs y(t). These inputs x(t) are variables that can be manipulated. In addition to these inputs, there are also inputs which cannot be measured and also some inputs that cannot be manipulated. These are not shown. From the standpoint of the outputs y(t), there are a number of types of outputs—there are measurable outputs and immeasurable outputs. In general, the output y(t) illustrated on an output 12 comprises all of the outputs, both measurable and immeasurable.

The values for operating the plant in the form of the x(t) variables are generated by a controller 14. The controller 14 generates these values in response to information received from an optimizer 16. The optimizer 16 is operable to receive all or select ones of the outputs from the plant 10 and is also operable to receive the current inputs x(t). Although not shown, the optimizer 16 can also receive such things as immeasurable inputs and inputs that cannot be manipulated.

The optimizer 16 is operable to provide an optimized set of input variables x̂(t) input to the controller 14. This optimizer 16 operates to generate optimized values by utilizing a set of constraints and also some type of optimization objective. The optimization objective defines the desired result of the optimization operation. For example, it may be that certain economic costs need to be considered when optimizing the operation of the plant. Constraints are basically the restrictions placed upon the optimization process, such as gain, maximum range of values for the inputs x(t), etc., which will be described in more detail hereinbelow.

Figure 2:
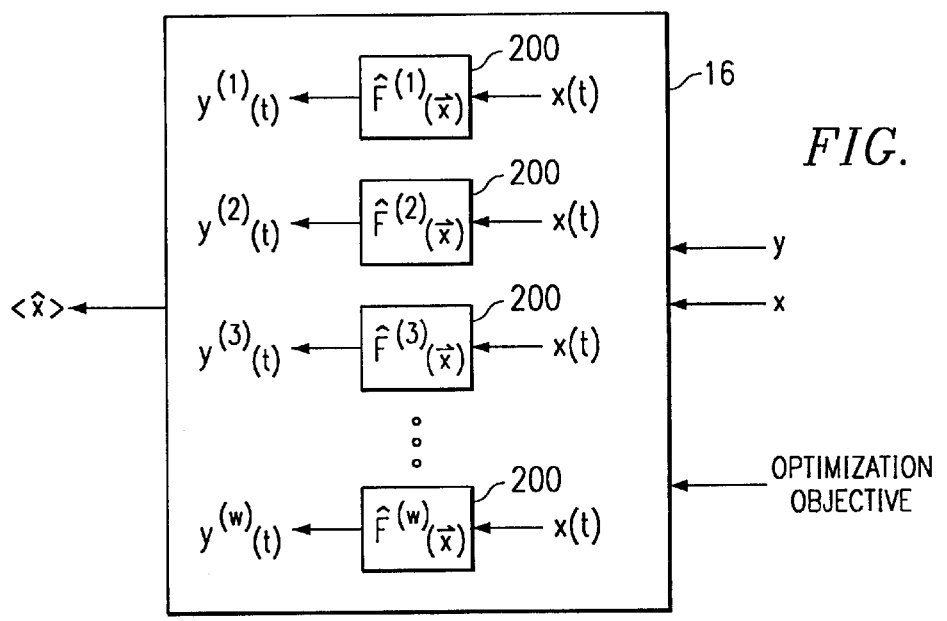
FIG. 2 illustrates a diagrammatic view of the optimizer of FIG. 1.

Referring now to FIG. 2, there is illustrated a block diagram of the optimizer 16. The optimizer 16 includes a plurality of models 200 each operable to map the values x(t) through a representation of the plant 10 to provide a predicted value $y^{(w)}(t)$ on the output where "w" is the index of the model. The x(t) variables or values are mapped through the representation as follows:

$$\vec{y}(t) = F^{(w)}(\vec{x}(t)) \tag{3}$$

This will provide a plurality of the models 200, each in general being different. As will be described hereinbelow, each of these models is trained to provide a stochastical method for optimization of the output with respect to the input by averaging over many (non-linear or linear) progression models 200. Each of the models 200 is related to the other of the models 200 by a stochastical relationship. During training, as will be described hereinbelow, the models 200 are related to each other such that each of the models have parameters that are stochastically related to each other, the models defined by the relationship:

$$\vec{y} = F^{(w)}(\vec{x}) \tag{4}$$

There are "w" of these models, such that there are also $y^{(w)}(t)$ outputs provided, one for each of the models $F^{(w)}x(t)$. The index "w" indicates these stochastically related models. The optimization operation utilizes these models in conjunction with the optimization objectives and constraints to generate an optimized value $\hat{x}(t)$ which is averaged over all of the models 200.

The method of optimizing an output with respect to inputs described hereinabove, with the option of being subject to constraints from first principles models, provides some advantages over the standard neural network methods primarily by giving rise to high quality solutions in the system identification phase in a parameter insensitive way that avoids overfitting. Furthermore, by having a clean statistical interpretation, the approach easily lends itself to estimating confidence levels and related quantities.

The prediction operation will be described for the stochastic method in a more detailed manner in the following. The data is contained in a dataset D with an index n representing the portion thereof that is associated with training. Indices exceeding n (n+1, n+2, . . . ) refers to data not included in the training process, this being the testing data, and no index refers to an arbitrary data point. Subscripted values $x_p$ and $y_q$ refer to an arbitrary component of an x(t) or y(t) vector, respectively. Also in the formalism herein, it will be assumed that the model outputs y(t) are subject to Gaussian noise. This choice is just for pedagogical reasons—the method is valid for any distribution, and it should be understood that other distributions could exist.

In the first step, it is necessary to predict $y^{(n+k)}(t)(k \geq 1)$, given the measured data D and a set of model functions $F^{(w)}x(t)$ each described by a set of parameters ω (e.g. neural network weights), with o being a vector value of weights with values $\omega_1, \omega_2, \ldots \omega_r$, "r" being the number of weights in the model. The average predicted output $y^{(n+k)}(t)$ is then given by:

$$\langle \overline{y}^{(n+k)} \rangle \propto \sum_{w=1}^{N_W} F^{(w)}(\vec{x}^{(n+k)}) \prod_{i=1}^{n} P(\vec{\omega} \mid D) \tag{5}$$

where P(ω|D) is the conditional probability (called the posterior) for the model $F^{(w)}x(t)$ with weights ω given the dataset D. Using the well-known Bayesian relation and the fact that P(D) is constant, the following relationship is obtained:

$$\langle \overline{y}^{(n+k)} \rangle \propto \sum_{w=1}^{N_W} F^{(w)}(\vec{x}^{(n+k)}) \prod_{i=1}^{n} P(y^{(i)} \mid x^{(i)}, \vec{\omega}) P(\vec{\omega}) \tag{6}$$

where $$\prod_{i=1}^{n} P(y^{(i)} \mid x^{(i)}, \vec{\omega})$$

is the likelihood, P(ω) is a prior distribution of the parameters or model weights ω, and their product is the posterior distribution. Assuming (not necessary) also a Gaussian distribution for the likelihood distribution of the weights of the model, the average predicted output relationship is as follows:

$$\langle \overline{y}^{(n+k)} \rangle \propto \sum_{w=1}^{N_W} F^{(w)}(\vec{x}^{(n+k)}) e^{-E(\vec{\omega}, \alpha, \beta, D)} \tag{7}$$

where:

$$E(\vec{\omega}, \alpha, \beta, D) = \frac{1}{2} \sum_{i=1}^{n} (\vec{y}^{(i)} - F^{(w)}(\vec{x}^{(i)}))^2 + \frac{\alpha}{2} \sum_{j=1}^{N_W} (\vec{\omega}_j)^2 + \frac{\beta}{2} H(\vec{\omega}, D) = -\log(posterior) \tag{8}$$

the first term representing the summed square error over the dataset D with n being the number of patterns, and the second term corresponding to the prior penalizes large weights (a regularizer). The third term, also part of the prior, is written as a generic constraint that could include, for instance, fitting on different levels to first principles knowledge. The value of i ranges over the dataset D, with n being the number of patterns.

Figure 3:
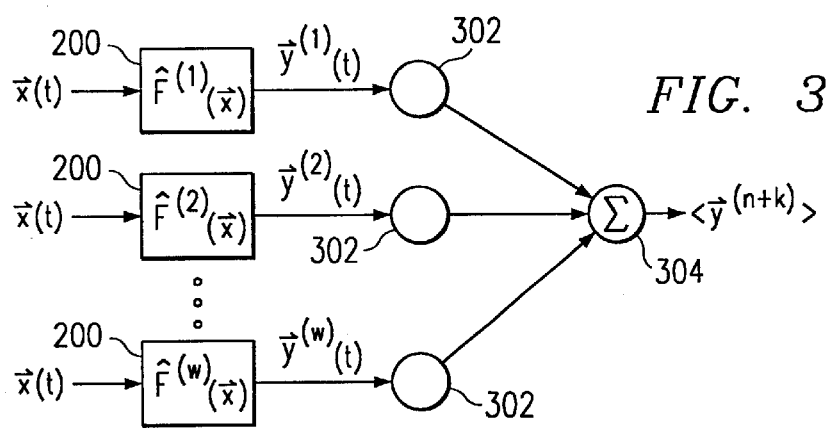
FIG. 3 a block diagram of the combination of the models utilizing a weighted average.

Referring now to FIG. 3, there is illustrated a block diagram of the average predicted output $y^{(n+k)}(t)$. Each of the models 200 has the output thereof input to a weighting block 302 which applies the weighting function $e^{E(\omega, \alpha, \beta, D)}$ to the output of each of the models 200. The output of each of the weighting blocks 302 is then input to a summing block 304 to provide the weighted average $y^{(n+k)}$.

In the situation wherein the models are utilized in a feedback mode, i.e., for the purpose of predicting input values, and which feedback is utilized for control, the gain is an important factor. Therefore, during the training of the model, it is necessary to take into account the gain as one constraint on the training. This is reflected in the term $H(\omega, D)$ which, when gain constraints are considered, results in the following relationship:

$$H(\vec{\omega}, D) = \sum_{p,q} \sum_{i} f\left(\frac{dy_q^{(w)}}{dx_p}\right) \quad (9)$$

where f( ) measures whether the argument satisfies the known constraint, and the index i in the sum indicates the $x^i(t)$ vector point at which the derivative is evaluated. The adjustable parameter families $\alpha$ and $\beta$ are drawn from fixed prior distributions described by $\alpha_0$ and $\beta_0$, and also it is noted that the derivative $(dy_q(t)^{(w)}/dx_p(t))$ is the derivative for the model $F^{(w)}x(t)$ (in Equation (5)) summed over the (q,p) matrix of inputs/outputs. This provides the (q,p) matrix of gains for each model. It is noted that minimizing the error value E corresponds to standard neural network learning that would give rise to one solution (or network, or model) $\omega=\omega^*$, these being the weights necessary to minimize the error.

The models $F^{(w)}x(t)$ are generated for estimating $<y^{(n+k)}(t)>$ (in Equation (7)) by making moves in the high dimensional parameter space $(\omega,\alpha,\beta)$. Since the distribution over $F^{(w)}x^{(n+k)}(t)$ is averaged over a strongly peaked distribution, this is typically done using importance sampling Monte Carlo algorithms, such as the Langevin method, or type Metropolis with Hybrid Monte Carlo, and/or tempering extensions to ensure that the entire search space is properly probed. (A wide variety of other methods are of course possible and these noted methods are not considered exhaustive.) The error E for this model is monitored as the parameter updates proceed. Initially, its long-time average drops and then it flattens off to a "thermnalized" static behavior, from which configurations are used to compute $<y^{(n+k)}>$ in Equation (7). In other words, the summation over $N_w$ in Equation (7) is restricted to an interval $[N_{min}, N_{max}]$, where $N_{min}$ (w=1) is given by the onset of static behavior, and $N_{max}$ is set by the required accuracy of $<y^{(n+k)}>$, and in the case of process optimization, which is described hereinbelow, by the available computational time. This provides an ensemble of $N_w=N_{max}-N_{min}$ models $F^{(w)}x(t)$ trained to be valid for each of the n data records over the dataset D. In the above, this ensemble was used for predicting the outputs $y^{(n+k)}(t)$ when only the corresponding inputs $x^{(n+k)}(t)$ are available (Equation (7)).

Figure 4:
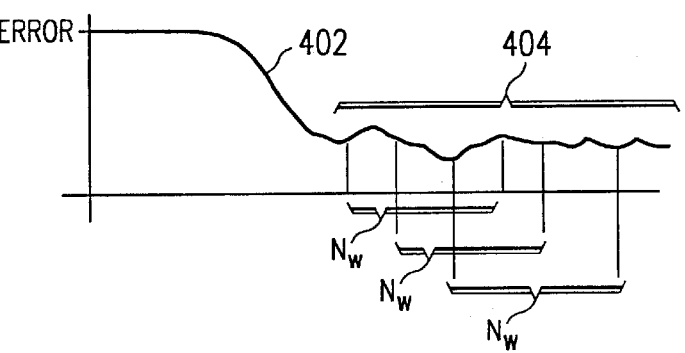
FIG. 4 illustrates a diagram depicting the training operation for the network.
Figure 5:
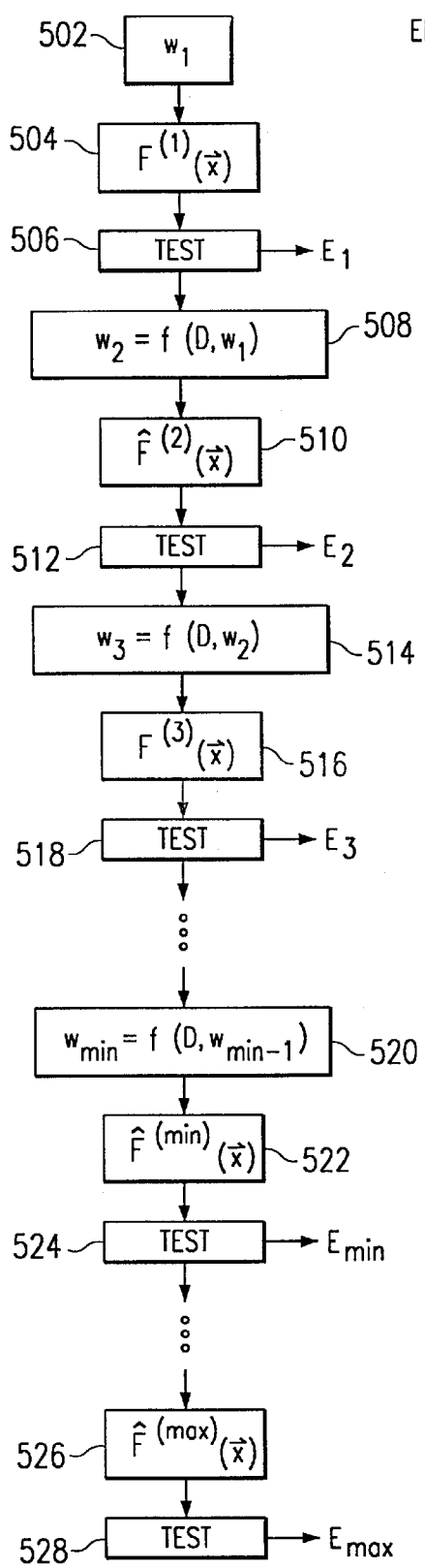
FIG. 5 illustrates a process flow for the training operation of the multiple models.

Referring now to FIG. 4, there is illustrated a diagrammatic view for the "thermalized" static behavior utilizing the training operation and, also referring to FIG. 5, there is illustrated a diagrammatic flow for the training operation. Both of FIGS. 4 and 5 will be referred to. With specific reference to FIG. 5, the training operation is initiated by a set of weights $\omega_1$, represented by a block 502. These weights are utilized to generate a first model $F^{(1)}x(t)$, represented by a block 504. The model is then tested in a test block 506 by utilizing the test data in the portion of the dataset n+k, the data above the training data n. This generates a first error value $E_1$. This data is then utilized to generate the next set of weights $\omega_2$. The above-noted directed random search techniques, such as the Langevin method, are utilized to generate these new weights by utilizing the weights from the previous model in the progression as the starting point.

Therefore, they will have the relationship $\omega_2=f(D, \omega_1)$. This is represented in a block 508. These weights are utilized to train a second model $F^{(2)}x(t)$, as represented in block 510, this representing a progression model. This is a model that has a stochastic relationship to the first model in block 504. This model is subsequently tested in a block 512 to determine the new error $E_2$ for that model. A new set of weights $\omega_3$ is generated by the stochastic method, as represented by a block 514. This will be utilized to generate a third model $F^{(3)}x(t)$, as represented by a block 516. This will also be tested in a block 518 to generate an error value $E_3$.

The steps noted hereinabove, between blocks 502 and 518, will continue for a number of progressive models, resulting initially in the generation of errors that represent the un-thermalized behavior in a portion of 402 of the diagrammatic view of FIG. 4. This will continue until the error is reduced. At this time, a model $N_{min}$ will be generated with weights $\omega_{min}$, as represented by a block 520. This will be represented by the relationship $\omega_{min}=f(D, \omega_{min-1})$, as represented by the block 520. This will be utilized to generated the model $F^{(min)}x(t)$, which is then tested at a block 524 to generate the error value $E_{min}$. This represents the first model for the value $N_w$ such that for the next $N_{w-1}$ models up to the value of $N_{max}$, there will be $N_w$ models. The model associated with $N_{max}$ is represented in block 526, which model is then tested in block 528 to generate the error value $E_{max}$. In general, as represented by the diagram in the diagrammatic view of FIG. 4, there is a "sliding" group of $N_w$ adjacent models maintained. Depending upon the processing capabilities of the system, this number can be any range. In the disclosed embodiment, as an example only, five hundred models are utilized. This results in the earliest model over five hundred being discarded such that only five hundred models are maintained. The training continues until the model in block 522 and the model in block 562 are both within the region represented by reference numeral 404 in FIG. 4. Therefore, all of the models will be in the "thermalized" region.

In addition to being able to compute $y(t)=F^{(w)}x(t)$ from $x(t)$ for each model in the ensemble (from which the final average $<y(t)>$ is computed), another essential computation for most process applications is to be able to compute the (q, p) matrix of derivatives $\partial y_q^{(w)}(t)/\partial x_p(t)$ for each model $F^{(w)}x(t)$ in the ensemble, at any vector point $x(t)$, the (q,p) matrix representing the matrix of derivatives indexed by the inputs and outputs for a multi-input/multi-output system. These derivatives are necessary for at least two fundamental purposes:

(1) sensitivity analysis, and (2) optimization and/or control

Each of the $N_w$ ensembles of $F^{(w)}$ models is a continuous function; therefore each derivative $\partial y_q^{(w)}(t)/\partial x_p(t)$ may be evaluated at any vector point $x(t)$ by the elementary rules of calculating derivatives.

The average derivatives, weighted over the ensemble of models, can then be calculated by the following relationship:

$$\frac{\partial \langle y_q(t) \rangle}{\partial x_p(t)}(\vec{x}(t)) \propto \sum_{w=1}^{N_w} \frac{\partial y_q(t)}{\partial x_p(t)} \vec{x}(t) \prod_{i=1}^{n} P(y^{(i)} | x^{(i)}, \vec{\omega}) P(\vec{\omega}) \quad (10)$$

In this relationship the values for derivatives are averaged over the models. To reduce computation time, it may be desirable to estimate Equation (10) instead of computing it fully. The best single-term estimate would be the one with the largest posterior (or probability weighting factor) for weighting the gains:

$$\prod_{i=1}^{n} P(y^{(i)} | x^{(i)}, \vec{\omega}) P(\vec{\omega}) \quad (11)$$

In Bayesian terminology, any such estimate is called the MAP (maximum a posteriori) estimate. In order for this MAP estimate to significantly reduce computing time, it would be necessary to have access to the ensemble of models already sorted in posterior magnitude order: a sorted index to the models at the completion of the training procedure could quickly and easily be created. Since this would be done only once, the required computing time would be insignificant.

Figure 6:
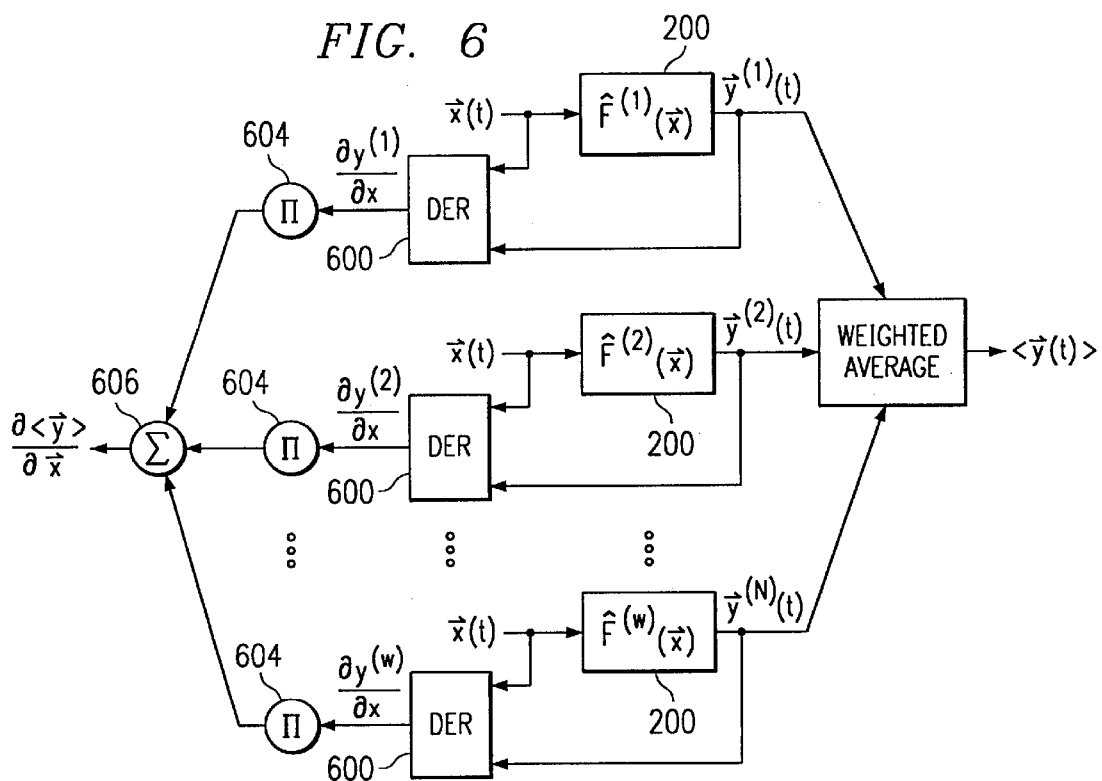
FIG. 6 illustrates a block diagram of the optimizer wherein a single optimized value is determined averaged over all of the models.

Referring now to FIG. 6, there is illustrated a block diagram depicting the operation illustrated in Equation (10), the models 200 each having outputs thereof input to a weighted average block to provide the weighted average output <y(t)>. In order to provide the derivatives, the values on the output of each of the models 200 must be back-propagated through the model to determine the derivative thereof, or any other technique that will provide that derivative. The backpropagated method is basically a recursive approach. This is represented by a derivative block 600 for each of the models 200. The derivative block 600 is operable to receive the x(t) value and the output of the associated model 200 $y^{(w)}(t)$. The output of the derivative block 600 is $\partial y^{(w)}(t)/\partial x(t)$. Each of the derivatives output by each of the blocks 600 are input a weighting block 604 which is operable to provide a weight to each of the derivatives which are then summed in a summing block 606. This provides the weighted average of the derivative $\partial <y(t)>\partial x(t)$ over all of the models.

This basic idea of estimating using the single MAP model can be iterated to improve the estimation to the desired level of accuracy. The second level estimate would consist of taking the model with the next highest posterior (next model in the indexed list) and averaging it with the first (the MAP) model, to yield a two-model average. This process could be iterated, incrementally improving the estimate, with some stopping criterion defined to halt the procedure. A stopping criterion might be to halt when the change in the estimate due to adding the next model is less than some threshold. The extreme of this process is of course the full sum of Equation (10).

The above discussion of Equation (10) or its estimation, involved taking the derivative $\partial y_q^{(w)}(t)/\partial x_p(t)$ evaluated at a given vector point x(t), and computing their (posterior weighted) average over the ensemble of models. Sensitivity analysis examines statistics over the dataset of these ensemble-averaged derivatives. Consider, for instance, taking the absolute value of the ensemble-averaged derivatives, and averaging them over the dataset: this information would indicate the overall relative strengths, over the historical operating conditions represented by the dataset, of the effect of each input variable $x_p(t)$ on a given output variable $y_q(t)$. This double-average derivative could be written:

$$\left\langle \left| \frac{\partial \langle y_q(t) \rangle}{\partial x_p(t)} \right| \right\rangle_D \propto \quad (12)$$

-continued
$$\sum_j \sum_\omega \left| \frac{\partial \langle y_q^{(\omega)}(t) \rangle}{\partial x_p(t)} (\vec{x}^{(j)}(t)) \right| \prod_{i=1}^n P(\vec{y}^{(i)}(t) | \vec{x}^{(i)}(t), \vec{\omega}) P(\vec{\omega})$$

where $< >_D$ indicates the average over the dataset of vector points $x^j(t)$.

In addition, statistics over the dataset other than the average can often yield useful information, such as the median, the standard deviation, and so forth.

Optimization/Control

Process optimization ordinarily refers to determining the optimal input vector $\hat{x}(t)$ that will minimize a defined objective function J while satisfying any defined constraint functions $C_m$. J is ordinarily a function of the process model and its variables, which expresses the desired characteristics of process operation, output product characteristics, and so forth. The $C_m$ functions are more often (though not always) a function only of the input variables, which express relationships among the process variables which must hold for physical or desired operational reasons; for example, a mass-balance constraint might dictate that x1=x2+x3. A valid solution of a constrained optimization problem always satisfies the $C_m$ relationship, and minimizes J as well as possible within those constraints.

"Optimization" typically means "steady-state optimization" (finding an optimal point in operating space using a steady-state model), while "control" typically means "dynamic control" (finding an optimal trajectory in operating space using a dynamic model). Both are "optimization problems."

In optimization or control, an optimization algorithm uses the process model to find the optimal $\hat{x}(t)$, given the objective J and constraint $C_m$ functions. Neural network models are in general nonlinear, so nonlinear optimization algorithms are used. Unconstrained or constrained optimization is performed depending upon whether or not any constraint functions are defined. Mathematically, unconstrained and constrained nonlinear optimizations are very different, and different optimization algorithms are used. Henceforth the general (and most typical in industrial processes) case of constrained nonlinear optimization will be assumed.

Nonlinear constrained optimization algorithms that make use of derivatives generally execute much faster than those that do not. A variety of such nonlinear constrained optimization programs are commercially available. The most popular codes are based on the Sequential Quadratic Programming (SQP) or the Generalized Reduced Gradient (GRG) methods.

A prototypical objective function is $J=\Sigma_k (<y^{(n+k)}>-y^{(N+k)})^2$, i.e., the sum over all non-training datapoints of the squared difference between a desired (setpoint) output value $y^{(n+k)}(t)$ and the Bayesian model output $<y^{(n+k)}(t)>$. A more general example of an objective function is one representing the (negative, as the objective function is to be minimized) profit of the process (by associating prices and costs with the input and output variables). One possibility would be to then use the resulting output variable values as setpoints for those output variables.

In order to optimize the objective function J with respect to the input variable x(t), it is necessary to determine $\partial J/\partial x_p(t)$. Utilizing simple rules for derivatives, it is relatively easy to determine the optimized value for the Bayesian model output (y(t)) by the relationship $\partial J/\partial <y(t)>$. However, utilizing the multiple models, the weighted average must be factored into the calculation in order to determine the optimization with respect to the optimization of the objective function J with respect to the input x(t). In order to determine to this, the chain rule is utilized. By the chain rule, the following holds:

$$\left.\frac{\partial J}{\partial x_p(t)}\right|_p = \sum_q \frac{\partial J}{\partial \langle y_q(t) \rangle} \frac{\partial \langle y_q(t) \rangle}{\partial x_p(t)} \quad (13)$$

because the output variables $\langle y_q(t) \rangle$ are referenced explicitly, the first factor $\partial J/\partial \langle y_q(t) \rangle$ is computable by the elementary rules of differentiation for each input $x_p(t)$. The second factor, however, involves the Bayesian ensemble of models, which relate $\langle y_q(t) \rangle$ to $x_p(t)$, thus representing the sum over all models.

Therefore, for purposes of (derivative-based) process optimization or control using Bayesian modeling, the (q, p) derivative matrix $\partial y_q^{(w)}(t)/\partial x_p(t)$ from Equation (10), one for each model $F^{(w)}x(t)$ in the ensemble, is the fundamental quantity required. From these matrices, the values $\partial y_q(t) \rangle / \partial x_p(t), \partial J/\partial x_p(t)$ can be determined, and, if the $y_q(t)$ values are referenced in any $C_m$ functions, $\partial C_m/\partial x_p(t)$ can be computed by the relationship:

$$\left.\frac{\partial C_m}{\partial x_p(t)}\right|_p = \sum_q \frac{\partial C_m}{\partial \langle y_q(t) \rangle} \frac{\partial \langle y_q(t) \rangle}{\partial x_p(t)} \quad (14)$$

In each method, any nonlinear constrained optimization code, such as an SQP or GRG code, may be used to perform the optimization. Any such code searches the x-space for the x-value that will minimize the given J while satisfying the given $C_m$ by iteratively passing to user-supplied subroutines an x(t) value (in general, different at each iteration) and receiving back the objective and constraint functions, and the derivatives, all evaluated at x(t). The derivatives may of course be computed in full or may be estimated to any degree of accuracy, as described hereinabove.

There are at least two fundamentally different ways that optimization over a Bayesian ensemble of models may be carried out. Roughly speaking, method (1) performs a single optimization over the entire ensemble, and method (2) performs multiple optimizations, one for each model in the ensemble, and when finished combines the results.

Optimization Method (1):

In this method, the optimization routine performs a single optimization over all of the models in the ensemble and returns a single optimal value for $\hat{x}(t)$. When the optimizer requests the values of the functions and derivatives evaluated at a point x(t), a user-supplied subroutine must compute the derivative values $\partial \langle y_q(t) \rangle/\partial x_p(t)$ by applying the chain rule of Equation (13) to the entire ensemble of models. After some number of iterations of such subroutine calls, the single optimization procedure terminates with an optimal $\hat{x}(t)$.

Figure 7:
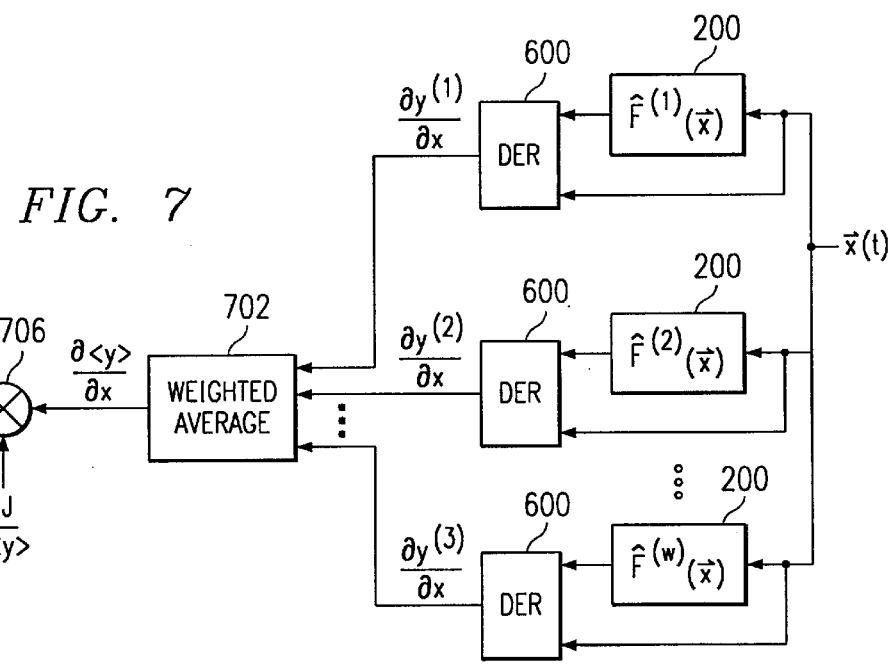
FIG. 7 illustrates a block diagram depicting the optimizer wherein each model is optimized and then the optimized values averaged.

Referring now to FIG. 7, there is illustrated a block diagram of the first optimization method. In this method, the models 200 are provided, each for receiving the input value x(t) and outputting the output value y(t). There are provided $N_w$ models $F^{(w)}(x(t))$. The output of each of the models 200 is input to the block 600 which is operable to determine the derivative on the output thereof. Each of the derivatives from each of the blocks 600 for each of the models 200 are input to a weighted average block 702 which is operable to provide the weighted average of the derivative as set forth in Equation (10). This is then subjected to the chain rule of Equation (13) via a block 706 to provide the single optimal value for $\hat{x}(t)$. Note that this is performed at each value of x(t), as noted hereinabove with respect to Equation (13). Also, it is noted that the weighted average operation is performed prior to applying the chain rule. To summarize method (1), the probability distribution $P(\omega|D)$ is provided for a single model with the other probability distribution then sampled utilizing the optimizer.

Optimization Method (2):

In this method, each model in the Bayesian ensemble is optimized separately, yielding an optimal $\hat{x}^{(w)}(t)$ for each model $F^{(w)}x(t)$. During the optimization of each model, an optimization process for a model $F^{(w)}x(t)$ requests function and derivative values at a point $x_p(t)$. The functions and derivative values returned are for that single model only, that is, $\partial y_q(t)^{(w)}/\partial x_p(t)$. The optimization of each model 200 terminates with an optimal value $\hat{x}^{(w)}(t)$ for that model, such that there are $N_w$ such optimized values. At the completion of all optimizations, some operation, such as a weighted average, is performed over the set of $\hat{x}^{(w)}(t)$ values to output a single optimal $\hat{x}(t)$, e.g.:

$$\langle \hat{x}(t) \rangle \propto \sum_{w=1}^{N_w} \hat{x}^{(w)}(t) \prod_{i=1}^{n} P(\vec{y}^{(i)} | \vec{x}^{(i)}, \vec{\omega}) P(\vec{\omega}) \quad (15)$$

In addition, the distribution of $\hat{x}(t)$ values may hold useful information for process operation in addition to the single averages. It should be understood that combinations of these two fundamental optimization methods are to be considered and that the disclosed embodiment is not exhaustive.

Figure 8:
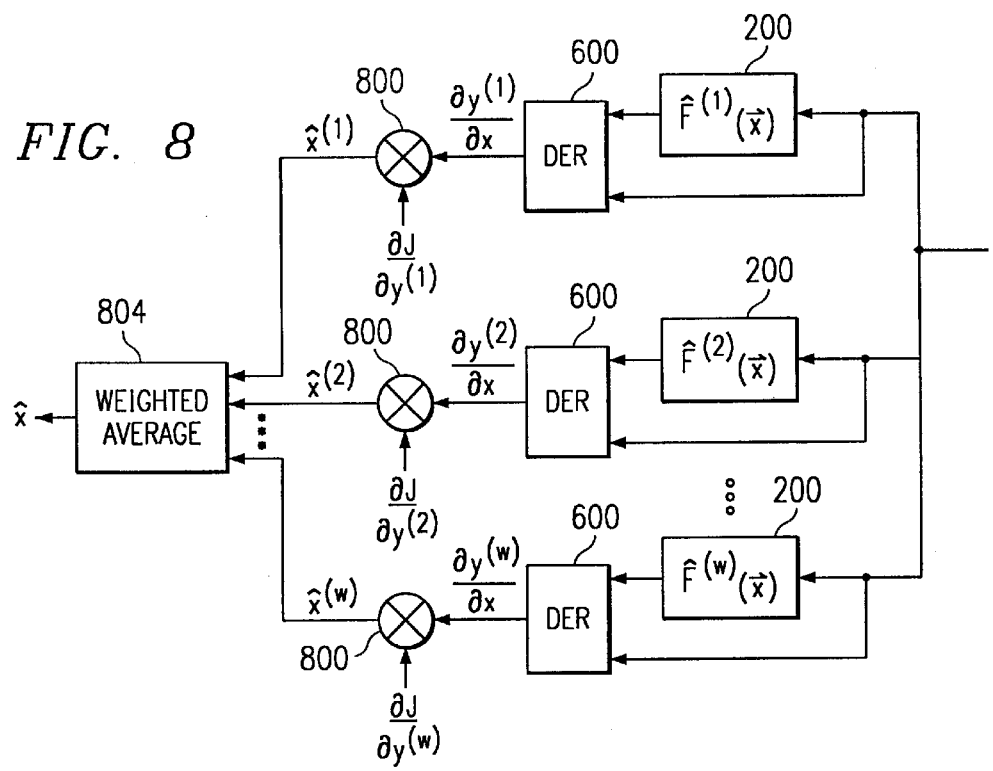
FIG. 8 illustrates a diagram for projecting a prediction over a horizon for a dynamic model in accordance with the disclosed embodiment.

Referring now to FIG. 8, there is illustrated a block diagram depicting the second method of optimization. In this diagrammatic view, the models 200 and derivative blocks 600 are provided for generating the derivatives for each of the associated models 200. The output of each of the derivative blocks 600 is, as distinguished from the embodiment of FIG. 4, input to a block 800, wherein that value is optimized over the output such that the optimized value $\partial J/\partial y^{(w)}(t)$ provides the value $\hat{x}^{(w)}(t)$ for each model. These are then processed through a weighted average block 804, which is operable to implement Equation (11) to provide a single optimal $\hat{x}(t)$. To summarize this optimization method, the probability distribution $P(\hat{x}, \vec{\omega}|D, J, C)$ provides the probability distribution over the $\hat{x}(t)$, given D, J and possibly C.

Referring now to FIG. 8a, there is illustrated a simplified block diagram of the embodiment of FIG. 8, wherein a single block 810 represents the combination of the models 200, derivative block 600 and multiplication blocks 800. This, as noted hereinabove, is operable to provide a plurality of estimated values for each model 200 in the form of $\hat{x}^{(1)}(t)$, wherein there are w estimated values for the input, one for each model. These are all input to a block 812 which block is operable to provide some type of selection or averaging operation, this being similar to the block 804 which performs specifically a weighted average. However, it should be understood that the selection operation in block 812 can utilize any criteria. For example, it could be a weighted average as described hereinabove, or it could be some type of selection criteria that selected the best single value. FIG. 8b illustrates a plot of the estimated input values as a function the index value where it can be seen that there is a Gaussian distribution of such values. The important aspect of this block 804 is that any type of selection criteria can be utilized to provide some value that is a function of all of the estimated values or some selection criteria that eliminates certain ones of the values and selects other values for an averaging type operation. In such a manner, all of the estimated values need not be utilized for the selection criteria.

Dynamic Models

The above discussion has been described with respect to steady-state process models. The indices k described hereinabove describe new data (n+k), whereas a dynamic system utilizes the index k to represent time intervals, which need not represent equally spaced time intervals. In general, a trajectory of output values $\{y(t+1) \ldots y(t+k_{max})\}(y_x(t))$ is predicted from a current y(t) for each new "setpoint" y(t) along with the a corresponding trajectory of control input values (corresponding to the x(t) inputs for the steady state process) necessary to provide such $y_x(t)$, which trajectory takes a predetermined number of the time intervals to achieve. The trajectory of control input values is defined for k=1 to k=$k_{max}$ as $\{u(t+1) \ldots u(t+k_{max})\}(u_k(t))$. The system will then make a move along this trajectory for a first interval of time and even additional intervals of times by predicting the new u(t) values necessary to make such a move before the next dynamic prediction is made. This dynamic prediction could be made at each move interval such that a new trajectory for the setpoint is predicted from a new control input value u(t). As such, the new "setpoint" optimization could be performed at each time interval.

When using the above-described optimization/control procedures for dynamic models, which are iterated out to the control horizon in time, the optimization is performed over the entire trajectory (time interval (t+1, t+$k_{max}$), where (t+1) represents the current time interval). The first step in the optimal trajectory is taken by the plant, and the whole optimization is begun again from that point. This is the generic model predictive control picture. The optimization over the trajectory is subject to an objective function and a variety of constraints, such as "hard" constraints on the trajectory which are wide at (t+1) and converge (with some specified tolerance) to the output setpoint at (t+$k_{max}$). In concept, the control optimization result is the optimal trajectory specified by values at each time increment. However, most model predictive control packages, including that described in U.S. patent application Ser. No. 08/643,464, filed May 6, 1996, and entitled "Method and Apparatus for Modeling Dynamic and Steady-State Processes for Prediction, Control and Optimization," incorporated by reference herein, use "blocking" to speed up the optimization, i.e., the control horizon is divided into t intervals, usually spaced closer near (t+1) and wider near (t+$k_{max}$) (logarithmic spacing). The number of independent optimization variables is thus only m times the number of control input variables, which shortens computation time dramatically with (almost always) very little difference in the first increment of the optimal trajectory, and makes it computationally tractable. The same choice between the two fundamentally different optimization methods described above apply just as clearly in the dynamic case.

Figure 9:
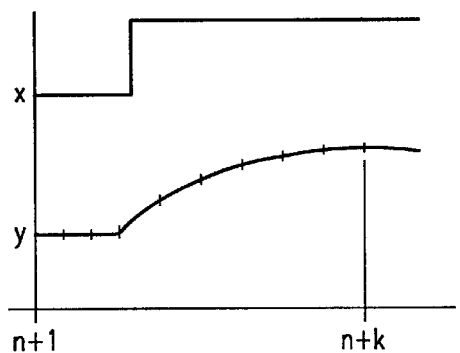
FIG. 9 illustrates a diagrammatic view of the optimization process for control.

Referring now to FIG. 9, there is illustrated a diagrammatic view of the trajectory of $y_k(t)$ determined in the optimization process for control. In this process, the time horizon is divided up into m increments or intervals, these being equal time segments or unequal time segments. It can be seen that the dynamic prediction for the value of $y_k(t)$ is made along the increments from the current position in time (t+1) and extending out to the horizon at the value of (t+k). This final $y^{(n+k)}(t)$ value is often equal (within some tolerances) to the output setpoint, provided the optimal change to u(t) was made.

Figure 10:
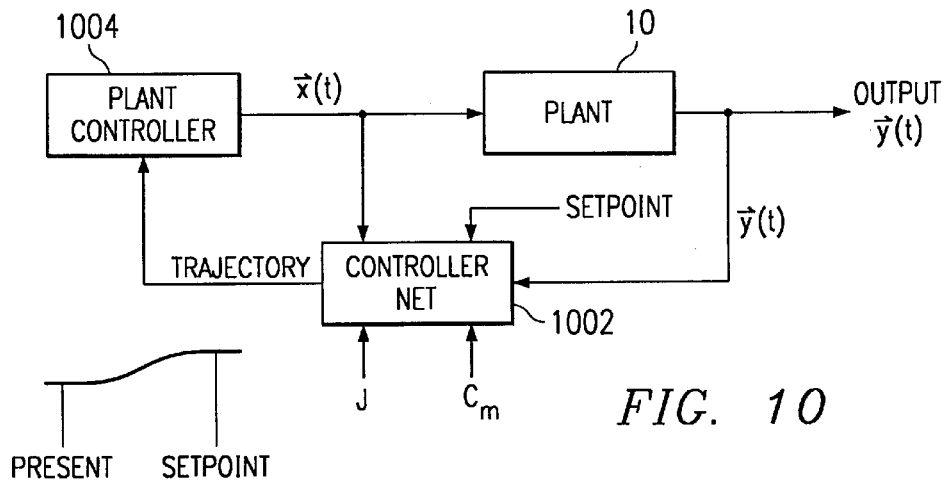
FIG. 10 illustrates a block diagram of the plant utilizing a multiple model feedback control network for predicting a trajectory over the control horizon.

Referring now to FIG. 10, there is illustrated a block diagram for the plant 10 utilizing a controller network 1002 in feedback. This is very similar to the optimizer 16 of FIG. 1, with the exception that it predicts a trajectory utilizing cost function J, constraints $C_m$, and various setpoints. The setpoints are typically in the form of a desired move in the output vector y(t). The controller network 1002 will receive as inputs select ones of the output y(t), and project the trajectory out over the control horizon in time and the u(t) values necessary to achieve such trajectory. This will typically be predicted in time intervals such that a dynamic plant controller 1004 will be able to generate new input values u(t).

In utilizing dynamic models, the models can be of differing types. In the disclosed embodiment, the dynamic model is a linear model which is defined by the following relationship:

$$\vec{y}_k = G(\vec{y}_{k-1}, \vec{y}_{k-2}, \vec{u}_{k-1-d}, \vec{u}_{k-2-d}, a, b) \quad (16)$$

where:

$y_{k-1}$, $y_{k-2}$ are outputs at different points in time;

$u_{k-1-d}$, $u_{k-2-d}$ are input values at different points in time;

d is a delay value; and a, b are the parameters of the linear model.

One example of the linear model is set by the following relationship:

$$\vec{y}_k = -a_1 \vec{y}_{k-1} - a_2 \vec{y}_{k-2} + b_1 \vec{u}_{k-1-d} + b_2 \vec{u}_{k-2-d} \quad (17)$$

Although Equation (17) is set forth as a linear equation with a linear model, additional non-linear terms can be attached to this equation to result in a non-linear model. However, the parameters of this model are set by the a's and b's, i.e., the parameter values of the model. This also pertains to the gain, this described in detail in U.S. patent application Ser. No. 08/643,464, which was incorporated by reference hereinabove.

When identifying the stochastically-related model via the various techniques described hereinabove, the disclosed one being the Bayesian technique, the models are trained in substantially the same way as the non-linear and neural networks, described with respect to the steady-state process hereinabove. This will yield w models which are stochastically related by the following relationship:

$$\vec{y}_k^{(w)} = -a_1^{(w)} \vec{y}_{k-2}^{(w)} + b_1^{(w)} u_{k-1-d} + b_2^{(w)} u_{k-2-d} \quad (18)$$

This will provide the models $y_k=G^w$ such that there are w of the stochastically-related dynamic models. As was set forth hereinabove, the first step is to predict the output value from each of the models given the measured dataset D and the set of model functions $G^{(w)}$, each described by a set of parameters a, b. The average predicted output is then given by:

$$\langle \vec{y}_k^n \rangle = \sum_{w=1}^{N_w} G^{(w)} (\vec{u}^n) P(a, b \mid D) \quad (19)$$

where P(a, b|D) is a conditional probability for the model $G^{(w)}$ with parameters a and b, given the dataset D. With the well-known Bayesian relation as described hereinabove, and the fact the P(D) is constant, the following relationship is obtained:

$$\langle \bar{y}_k^n \rangle \propto \sum_{w=1}^{N_w} G^{(w)}(\vec{u}^n) \prod_{i=1}^{n} P(\vec{y}^{(i)} | \vec{x}^{(i)}, a, b) P(a, b) \quad (20)$$

where $$\prod_{i=1}^{n} P(\vec{y}^{(i)} | \vec{x}^{(i)}, a, b)$$

is the likelihood. P(a, b) is the prior distribution of the parameters (a, b) of the model, and their product is the posterior distribution, as was described hereinabove with respect to the steady-state case. All of the above-noted equations apply to the dynamic case. The only difference is that the input is now u(t) and the parameters of the model are (a, b), as compared to ω.

In order to perform a sensitivity analysis or to perform an optimization and/or control, each of the $N_w$ ensembles of $G^{(w)}$ models must have the derivative thereof determined by the following relationship:

$$\frac{\partial y_{q,k}^{(w)}(t)}{\partial u_p(t)} \quad (21)$$

As noted hereinabove, it is then necessary to determine the average derivatives, weighted over the ensemble of models by the following relationship similar to Equation (21):

$$\frac{\partial \langle y_{q,k}(t) \rangle}{\partial u_p(t)}(\vec{u}(t)) \propto \sum_{w=1}^{N_w} \frac{\partial y_{q,k}(t)}{\partial u_p(t)}(\vec{u}(t)) \prod_{i=1}^{n} P(\vec{y}^{(i)} | \vec{x}^{(i)}, a, b) P(a, b) \quad (22)$$

Referring now to FIG. 11, there is illustrated a block diagram depicting the operation illustrated in Equation (22) for a dynamic model to determine the average derivative. This basically parallels the operation of the embodiment in the FIG. 6, described hereinabove with respect to steady-state models. There are provided a plurality of dynamic models 1100 corresponding to the static models 200 described hereinabove which are operable to provide a predicted value $y^{(w)}(t)$. The output of each of these models 1100 can be input to a weighted average block 1102 to provide the value <y(t)>. However, in order to provide the prediction for the average derivative $\partial \langle y(t) \rangle / \partial u(t)$, it is necessary to optimize the derivative as described hereinabove in the optimization method (1). This requires feeding both the input value u(t) and the output $y^{(w)}(t)$ for each model 1100 to a derivative block 1104. This provides the derivative for each value of $w \partial y^{(w)}(t)/\partial u(t)$. These derivatives for each of the models are then input to an averaging block 1106 to take the weighted average thereof, and then to a summing block 1108 to provide the average derivative $\partial \langle y(t) \rangle / \partial u(t)$.

Figure 12:
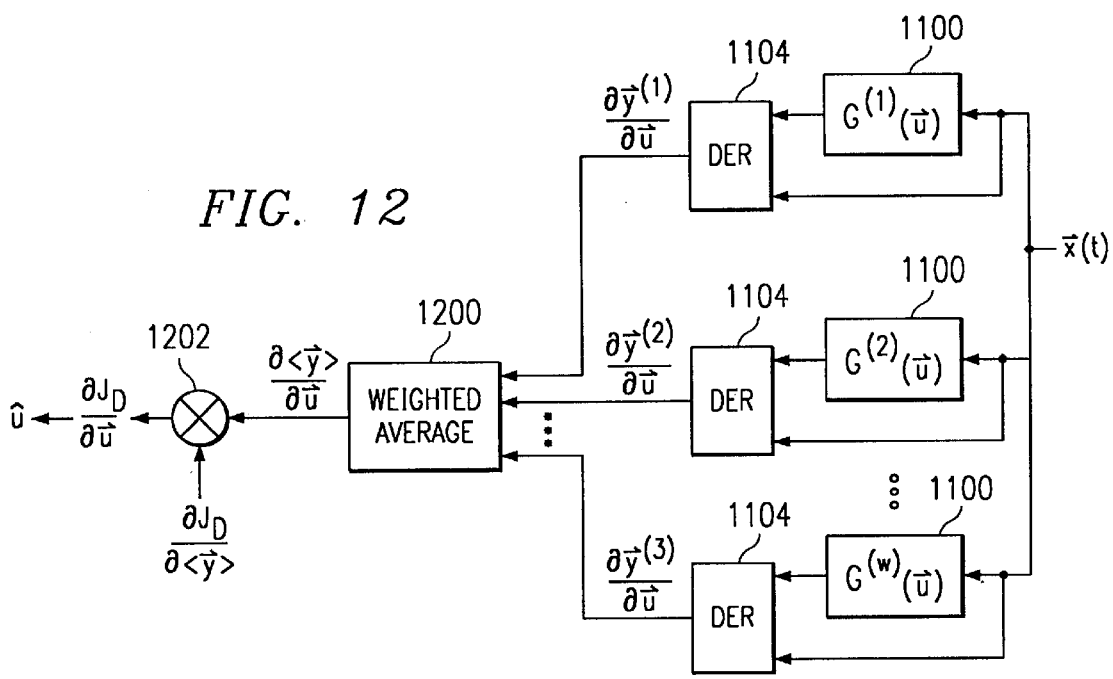

Once the average derivative is determined for the dynamic model, then this can be optimized, utilizing the optimization method (1) or the optimization method (2) described hereinabove, except that a dynamic model is used. This is illustrated in FIG. 12 which parallels FIG. 7 for the static model. The derivatives of each of the models output from the derivative block 1104 are first subjected to the weighted average in a block 1200, representing block 1106 and 1108, and then the average of the derivatives is then multiplied by the optimization objective $J_D$ for the dynamic model condition. This basically performs the chain rule by multiplying the derivative of $J_D$ with respect to the average output, $\partial J_D/\partial \langle y(t) \rangle$ to provide on the output the derivative of the optimization objection $J_D$ with respect to u(t), $\partial J_D/\partial \langle u(t) \rangle$. This essentially is the optimization method one for the dynamic case.

Figure 13:
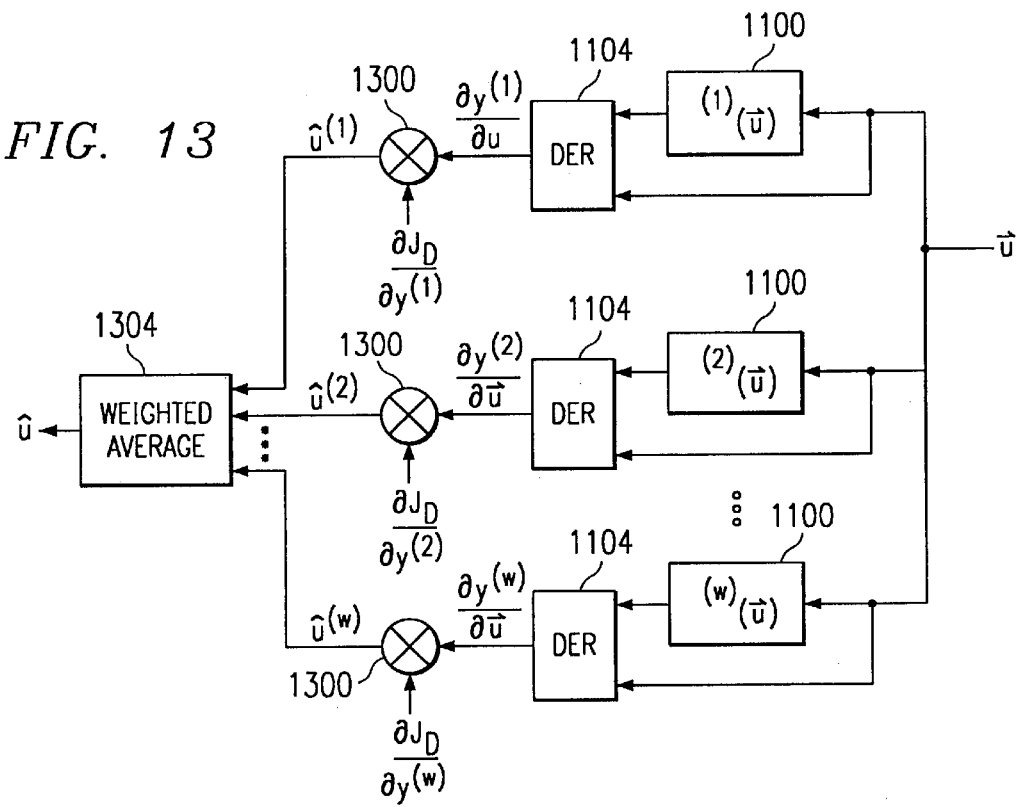
FIG. 13 illustrates a block diagram of the dynamic model corresponding to FIG. 8.

In optimization method (2), the dynamic model representation is illustrated in FIG. 13, which parallels FIG. 8. Each of the models 1100 has the derivative thereof determined by the derivative block 1104. However, rather than take the weighted average of the derivatives, each $\hat{u}^{(w)}(t+k_{min}) \ldots \hat{u}^{(w)}(t+k_{max})(\hat{u}_k^{(w)}(t))$ of the models has the derivative thereof optimized to provide an estimated control trajectory $\hat{u}^{(w)}(w)(t)$ for each value of w. These are the estimated values of the inputs for each model which are then processed through a weighted average block 1304 which, as described hereinabove, is operable to perform some type of algorithm or selection process thereon. This can be any type of selection process for the model. It could be an averaging operation, or it could be a selection process. This provides a single control trajectory û(t) value. Given the control trajectory û(t), the first value thereof is input to the plant.

In U.S. patent application Ser. No. 08/643,464, incorporated herein by reference, there was disclosed a technique for defining the gain of dynamic models as a function of the gain of the steady-state neural network model. The gain of the steady-state model is referred to by the term "$K_{ss}$," and the gain of the dynamic model is referred to as "$k_d$." The relationship for the dynamic gain, $k_d$, is defined in terms of the parameters (a, b) of the dynamic model as follows:

$$k_d = \frac{\sum_{i=1}^{n} b_i}{1 + \sum_{i=1}^{n} a_i} \quad (23)$$

Since the gain $K_{ss}$ of the steady-state model is known, the dynamic gain $k_d$ of the dynamic model can then be forced to match the gain of the steady-state model by scaling the $b_i$ parameters. The values of the static and dynamic gains are set equal with a value of $b_i$ scaled by the ratio of the two gains as follows:

$$(b_i)_{scaled} = (b_i)_{old} \left( \frac{K_{ss}}{k_d} \right) \quad (24)$$

$$(b_i)_{scaled} = \frac{(b_i)_{old} K_{ss} \left( 1 + \sum_{i=1}^{n} a_i \right)}{\sum_{i=1}^{n} b_i} \quad (25)$$

This makes a dynamic model consistent with its steady-state counterpart, as described in U.S. patent application Ser. No. 08/643,464, which was incorporated by reference hereinabove. Therefore, each time the steady-state value changes such that the operating region of the steady-state model is different, this will correspond to a potentially different gain $K_{ss}$ for the steady-state model. This value can then be utilized to update the gain $k_d$ of the dynamic model and, therefore, compensate for the errors associated with a dynamic model, wherein the value of $k_d$ is determined based on perturbations in the plant on a given set of operating conditions. Since all operating conditions are not modeled, the step of varying the gain will account for changes in the steady-state starting points. With respect to the present application utilizing stochastically related models, it is necessary to determine the dynamic gain of each of the dynamic models 1100.

Figure 14:
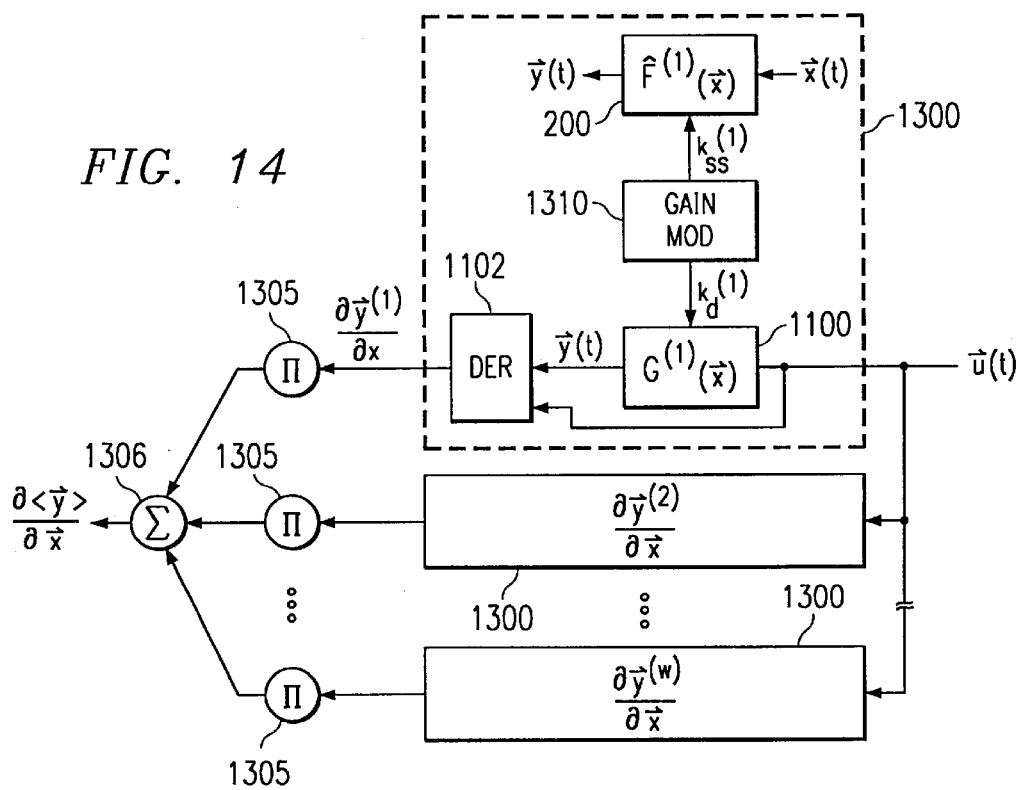
FIG. 14 illustrates a block diagram of the dynamic model utilizing a steady state model to fix the gain.

Referring now to FIG. 14, there is illustrated a block diagram of the optimizer 16 utilizing a steady-state model to fix the gain of the dynamic model 1100. The optimizer, as described hereinabove, is divided into a plurality of blocks for determining the derivative of $\partial y^{(w)}(t)/\partial x(t)$. These blocks are referred to with the reference numeral 1400. There are provided "w" of these blocks 1400, the output of each of these inputs input to a product block 1405, the outputs thereof summed in a summing block 1406 to provide on the output thereof the average or weighted derivative $\partial <y(t)>/\partial x(t)$.

Each of the blocks 1400 has associated therewith the dynamic model 1100 with the input u(t) and the output y(t) input to the derivative block 1104. Additionally, a steady-state model 200 is provided for each of the dynamic models 1100 in each of the blocks 1400. Therefore, each of the models 200 is a stochastically related model $F^{(w)}x(t)$ which has an associated steady-state gain $K^{(w)}_{ss}$. This is a known gain for that model. In the embodiment illustrated, the steady-state model 200 for w=1 is associated with the $G^{(1)}u(t)$ model 1100. A gain modulator 1410 is provided for determining the dynamic gain $k^{(1)}_d$. In the preferred embodiment, as set forth in U.S. patent application Ser. No. 08/643,646, the dynamic gain is forced to be equal to the steady-state gain. This provides the dynamic gain $k^{(1)}_d$ for the value of w=1.

The $b_i$ of each of the models 1100 would be defined with the index $b^{(w)}_i$. Therefore, when these are scaled with the gain modulator 1410 they would be scaled with the following relationship:

$$(b^{(w)}_i)_{seated} \frac{(b^{(w)}_i)_{old} K^{(w)}_{ss}\left(1 + \sum_{i=1}^{n} a^{(w)}_i\right)}{\sum_{i=1}^{n} b^{(w)}_i} \quad (26)$$

Although the index for the steady-state model 200 was set equal to the index for the dynamic model 1100, it should be understood that, even though there are multiple ones of the progressive steady-state models 200 and multiple ones of the progressive dynamic models 1100, it is not necessary to match the indices. For example, it could be that the index w=1 could be matched to the maximum value for the index on the dynamic model 1100, such that $F^{(500)}x(t)$ is matched to the dynamic model 1100 with the minimum index $G^{(1)}u(t)$, wherein the maximum index is w=500.

Figure 15:
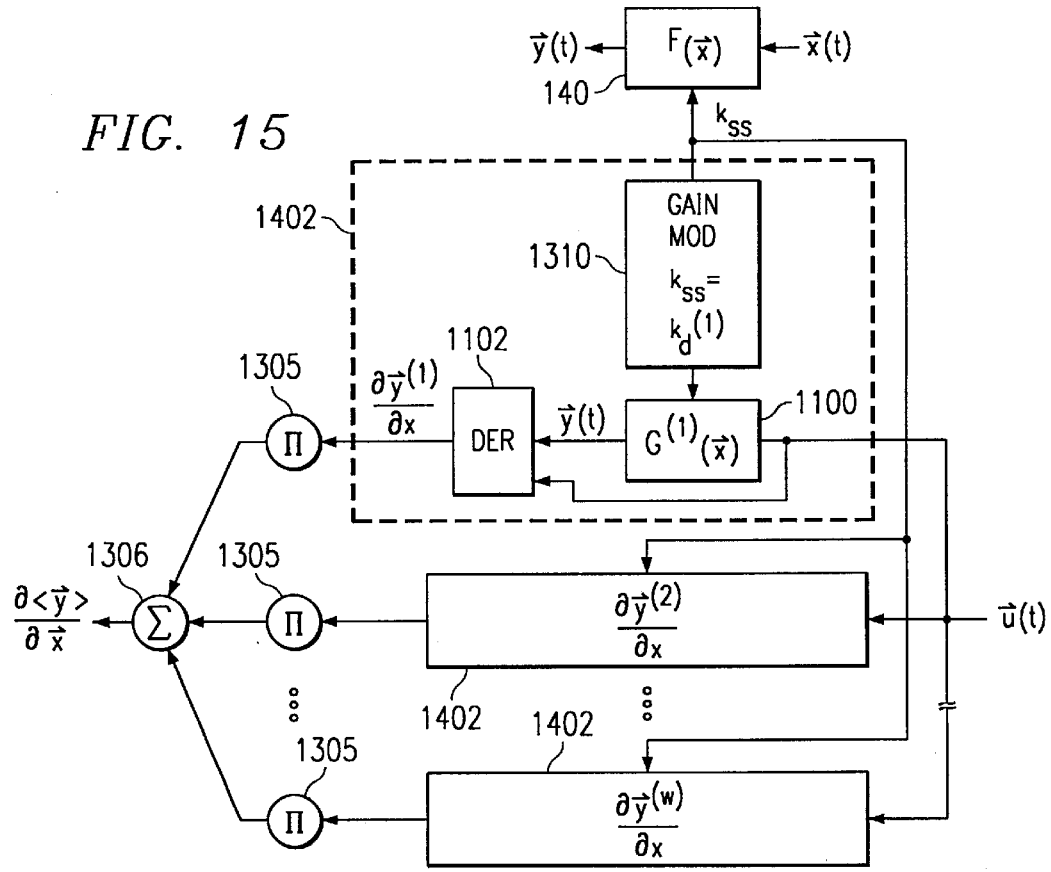
FIG. 15 illustrates an alternate embodiment of the dynamic model of FIG. 14.

In an alternate embodiment, as illustrated in FIG. 15, the gain of a single steady-state model 1500 is utilized to provide a single steady-state gain $K_{ss}$ for all of the gain modulation modules 1410, such that only one steady-state model is required. This is not a progressive model. Alternatively, the dynamic model for each of the blocks 1400 could be the same with the steady-state models 200 being progressive stochastically-related models. Therefore, there would be a plurality of blocks 1502 which contained only the dynamic model 1100, the derivative block 1104 and the gain modulator 1410. The steady-state gain $K_{ss}$ of the model 1500 would be input to each of the blocks 1502.

In summary, there has been provided a method and apparatus by which a stochastical method is utilized for optimizing y(t) with respect to x(t) through the use of averaging over multiple regression models $F^{(w)}$. This optimization is utilized to provide a single optimal vector for the values of x(t) which constitute inputs to a plant.

Although the preferred embodiment has been described in detail, it should be understood that various changes, substitutions and alterations can be made therein without departing from the spirit and scope of the invention as defined by the appended claims.

What is claimed is:

1. A method for determining the optimum operation of a system, comprising the steps of:

receiving the outputs of the system and the measurable inputs to the system; and optimizing select ones of the outputs as a function of the inputs by minimizing an objective function J to provide optimal values for select ones of the inputs;

wherein the step of optimizing includes the step of predicting the select ones of the outputs with a plurality of models of the system, each model operable to map the inputs through a representation of the system to provide predicted outputs corresponding to the select ones of the outputs which predicted outputs of each of the plurality of models are combined in accordance with a predetermined combination algorithm to provide a single output corresponding to each of the select ones of the outputs.

2. The method of claim 1, wherein the optimal value of the outputs of the plurality of models is determined as a single averaged optimal output value for each of the select ones of the outputs.

3. The method of claim 2, wherein the step of predicting the select ones of the outputs with the plurality of models of the system comprises predicting the output to a point forward in time as a trajectory.

4. The method of claim 1, and further comprising the step of applying the optimal values of the select ones of the inputs to the corresponding inputs of the system after determination thereof.

5. The method of claim 1, wherein the step of receiving the outputs of the system comprises receiving measurable outputs of the system.

6. The method of claim 1, wherein the step of optimizing comprises a derivative-based optimization operation.

7. The method of claim 6, wherein the step of optimizing comprises the steps of:

determining the average predicted output of the plurality of models <y(t)>;

determining the average derivative of the average predicted output <y(t)> with regards to the inputs x(t) as $\partial <y(t)>/\partial x(t)$;

the objective function J being a function of <y(t)> and determining a derivative of the objective function J with respect to <y(t)> as $\partial J/\partial <y(t)>$;

determining with the chain rule the relationship $\partial J/\partial x(t)$; and determining the minimum of the J.

8. The method of claim 7, wherein the average derivative of the average predicted output is weighted over the plurality of models.

9. A method for optimizing the parameters of a system having a vector input x(t) and a vector output y(t), comprising the steps of:

storing a representation of the system in a plurality of models, each model operable to map the inputs through a representation of the system to provide a predicted output, each of the models operable to predict the output of the system for a given input value of x(t), providing predetermined optimization objectives; and determining a single optimized input vector value $\hat{x}(t)$ by applying a predetermined optimization algorithm to the plurality of models to achieve a minimum error to the predetermined optimization objective.

10. The method of claim 9, wherein the step of determining comprises determining the derivative ∂y(t)/∂x(t) of each of the models and then determining an average of the derivatives ∂y(t)/∂x(t).

11. The method of claim 10, wherein the step of determining the average of the derivative comprises determining the weighted average of the derivatives ∂y(t)/∂x(t).

12. The method of claim 11, wherein the step of determining the average derivative is defined by the following relationship:

$$\frac{\partial \langle \vec{y}_q \rangle}{\partial \vec{x}_p(t)}(\vec{x}(t)) \propto \sum_{w=1}^{N_w} \frac{\partial \vec{y}_q(t)}{\partial \vec{x}_p(t)} \vec{x}(t) \prod_{i=1}^{n} P(\vec{y}^{(i)} | \vec{x}^{(i)}, \vec{\omega}) P(\vec{\omega})$$

where $$\prod_{i=1}^{n} P(\vec{y}^{(i)} | \vec{x}^{(i)}, \vec{\omega})$$

is the likelihood, $P(\omega)$ is a prior distribution of the parameters $\omega$ of the model, and their product is the posterior distribution.

13. The method of claim 9, wherein the step of storing a representation of the system in a plurality of models comprises storing a representation of the system in a plurality of non-linear or linear networks, each operable to map the: input x(t) to a predicted output through a stored representation of the system.

14. The method of claim 13, wherein the stored representation of the system in each of the plurality of non-linear or linear networks are related in such a manner wherein the parameters of each of the linear or non-linear networks are stochastically related to each other.

15. The method of claim 14, wherein the stochastic relationship is a Bayesian relationship.

16. The method of claim 9, wherein the predetermined optimization algorithm is an iterative optimization algorithm.

17. The method of claim 9, wherein the step of determining the single optimized input vector value $\hat{x}(t)$ comprises determnining the derivative of the predetermined optimization objective relative to the input vector x(t) as ∂J/∂x(t), where J represents the predetermined optimization objective.

18. The method of claim 9, wherein the step of determining comprises determining the derivative ∂y(t)/∂x(t) of each of the models and then determining an average of the derivatives ∂y(t)/∂x(t).

19. The method of claim 18, wherein the step of determnining the average derivative is defined over a (q, p) matrix by the following relationship:

$$\frac{\partial \langle \vec{y}_q \rangle}{\partial \vec{x}_p(t)}(\vec{x}(t)) \propto \sum_{w=1}^{N_w} \frac{\partial \vec{y}_q(t)}{\partial \vec{x}_p(t)} \vec{x}(t) \prod_{i=1}^{n} P(\vec{y}^{(i)} | \vec{x}^{(i)}, \omega) P(\omega)$$

where $$\prod_{i=1}^{n} P(\vec{y}^{(i)} | \vec{x}^{(i)}, \omega)$$

is the likelihood, $P(\omega)$ is a prior distribution of the parameters $\omega$ of the model, and their product is the posterior distribution.

20. The method of claim 19, wherein the step of determining ∂J/∂<x(t)> comprises the steps of:
determining the weighted average of the predicted output of each of the models by the following relationship:

$$\langle \vec{y}(t) \rangle \propto \sum_{w=1}^{N_w} F^{(w)}(\vec{x}) \prod_{i=1}^{n} P(y^{(i)} | x^{(i)}, \omega) P(\omega)$$

where $P(y^{(i)}|x^{(i)}, \omega) P(\omega)$ represents the posterior probability of the model indexed by w, and $N_w$ represents the maximum number of models in the stochastic relationship, and wherein the stored representation of the system in each of the plurality of models are related in such a manner wherein the parameters of each of the models are stochastically related to each other;
determining the derivatives ∂J/∂<y(t)> as the variation of the predetermined optimization objective with respect to the predicted output y(t); and
determining by the chain rule the following:

$$\left.\frac{\partial J}{\partial \vec{x}_p(t)}\right|_p = \sum_q \frac{\partial J}{\partial \langle \vec{y}_q(t) \rangle} \frac{\partial \langle \vec{y}_q(t) \rangle}{\partial \vec{x}(t)_p}.$$

21. A method for determining the dynamic operation of a system, comprising the steps of:
receiving the outputs of the plant system and the measurable inputs to the system; and
optimizing select ones of the outputs as a function of the inputs over a future horizon by minimizing an objective function J to achieve a predetermined desired setpoint to provide optimal values for select ones of the inputs over a trajectory to the desired setpoint in incremental time intervals;
wherein the step of optimizing includes the step of predicting as predicted outputs the select ones of the outputs over the trajectory at each of the incremental time intervals from the current value to the setpoint with a plurality of models of the system, each model operable to map the inputs through a representation of the system to provide predicted outputs corresponding to the select ones of the outputs, which predicted outputs of the plurality of models are averaged.

22. The method of claim 21, wherein the optimal value of the predicted outputs of the plurality of models is determined as a single averaged optimal output value for each of the select ones of the outputs at each of the incremental time intervals from the current value to the setpoint.

23. The method of claim 21, and further comprising the step of applying the optimal values of the select ones of the inputs for less than the number of incremental time intervals from the current value to the setpoint to the corresponding inputs of the system after determination thereof.

24. The method of claim 21, wherein the step of receiving the outputs of the system comprises receiving measurable outputs of the system.

25. The method of claim 21, wherein the step of optimizing comprises a derivative-based optimization operation.

26. The method of claim 25, wherein the step of optimizing comprises the steps of:
determining the average predicted output of the plurality of models <y(t)>;
determining the average derivative of the average predicted output <y(t)> with regards to the inputs x(t) as ∂<y(t)>/∂x(t);
the objective function J being a function of <y(t)> and determining a derivative of the objective function J with respect to <y(t)> as ∂J/∂<y(t)>;
determining with the chain rule the relationship ∂J/∂x(t); and
determining the minimum of the objective function J.

27. The method of claim 26, wherein the average derivative of the average predicted output is weighted over the plurality of models.

28. A method for optimizing the parameters of a system having a vector input x(t) and a vector output y(t) and with respect to the dynamic operation thereof from a current operating point to a desired setpoint for the output y(t), comprising the steps of:
storing a representation of the system in a plurality of models, each of the models operable to predict the output of the system for a given input value of x(t);
providing predetermined optimization objectives; and
determining a single optimized input vector value x̂(t) for each of a plurality of time increments between the current value and the desired setpoint over a future horizon by applying a predetermined optimization algorithm to the plurality of models to achieve a minimum error to the predetermined optimization objective at each of the plurality of time increments between the current value and the desired setpoint over the future horizon, each model operable to map the inputs through a representation of the system to provide a predicted output.

29. The method of claim 28, wherein the step of determining comprises determining the derivative ∂y(t)/∂x(t) of each of the models and then determining an average of the derivatives ∂y(t)/∂x(t).

30. The method of claim 29, wherein the step of determining the average of the derivative comprises determining the weighted average of the derivatives ∂y(t)/∂x(t).

31. The method of claim 30, wherein the step of determining the average derivative is defined by the following relationship:

$$\frac{\partial \langle \vec{y}_q \rangle}{\partial \vec{x}_p(t)}(\vec{x}(t)) \propto \sum_{w=1}^{N_w} \frac{\partial \langle \vec{y}_q \rangle(t)}{\partial \vec{x}_p(t)} \vec{x}(t) \prod_{i=1}^{n} P(\vec{y}^{(i)} \mid \vec{x}^{(i)}, \vec{\omega}) P(\vec{\omega})$$

$$\prod_{i=1}^{n} P(y^{(i)} \mid x^{(i)}, \vec{\omega})$$

is the likelihood, P(ω) is a prior distribution of the parameters ω of the model, and their product is the posterior distribution.

32. The method of claim 30, wherein the step of storing a representation of the system in a plurality of models comprises storing a representation of the system in a plurality of non-linear or linear networks, each operable to map the input x(t) to a predicted output through a stored representation of the system.

33. The method of claim 32, wherein the stored representation of the system in each of the plurality of non-linear or linear networks are related in such a manner wherein the parameters of each of the non-linear or linear networks are stochastically related to each other.

34. The method of claim 33, wherein the stochastic relationship is a Bayesian relationship.

35. The method of claim 29, and further comprising the step of applying the optimized input values of the select ones of the inputs x̂(t) for less than the number of incremental time intervals from the current value to the setpoint to the corresponding inputs of the system after determination thereof.

36. The method of claim 28, wherein the predetermined optimization algorithm is an iterative optimization algorithm.

37. The method of claim 28, wherein the step of determining the single optimized input vector value x̂(t) comprises determining the derivative of the predetermined optimization objective relative to the input vector x(t) as ∂J/∂x(t), where J represents the predetermined optimization objective between the current value and the desired setpoint.

38. The method of claim 28, wherein the step of determining comprises determining the derivative ∂y(t)/∂x(t) of each of the models and then determining an average of the derivatives ∂y(t)/∂x(t).

39. The method of claim 38, wherein the step of determining the average derivative is defined over a (q, p) matrix by the following relationship:

$$\frac{\partial \langle \vec{y}_q \rangle}{\partial \vec{x}_p(t)}(\vec{x}(t)) \propto \sum_{w=1}^{N_w} \frac{\partial \langle \vec{y}_q \rangle(t)}{\partial \vec{x}_p(t)} \vec{x}(t) \prod_{i=1}^{n} P(\vec{y}^{(i)} \mid \vec{x}^{(i)}, \vec{\omega}) P(\vec{\omega})$$

where $$\prod_{i=1}^{n} P(\vec{y}^{(i)} \mid \vec{x}^{(i)}, \vec{\omega})$$

is the likelihood, P(ω) is a prior distribution of the parameters ω of the model, and their product is the posterior distribution.

40. The method of claim 39, wherein the step of determining ∂J/∂<x(t)> comprises the steps of:
determining the weighted average of the predicted outputs of each of the models at each of the increments of time by the following relationship:

$$\langle \vec{y}(t) \rangle \propto \sum_{w=1}^{N_w} F^{(w)}(\vec{x}) \prod_{i=1}^{n} P(\vec{y}^{(i)} \mid \vec{x}^{(i)}, \vec{\omega}) P(\vec{\omega})$$

where $P(y^{(i)} \mid x^{(i)}, \vec{\omega}) P(\vec{\omega})$ represents the posterior probability of the model indexed by w, and $N_w$ represents the maximum number of models in the stochastic relationship, and wherein the stored representation of the system in each of the plurality of non-linear or linear networks are related in such a manner wherein the parameters of each of the non-linear or linear networks are stochastically related to each other;
determining the derivatives ∂J/∂<y(t)> as the variation of the predetermined optimization objective with respect to the output y(t) at each of the plurality of time increments between the current value and the setpoint; and determining by the chain rule the following:

$$\frac{\partial J}{\partial \vec{x}_p(t)}\bigg|_p = \sum_q \frac{\partial J}{\partial \langle \vec{y}_q(t) \rangle} \frac{\partial \langle \vec{y}_q(t) \rangle}{\partial \vec{x}(t)_p}.$$

41. An optimizing system for determining the optimum operation of a system, comprising:
   an input for receiving the outputs of the system and the measurable inputs to the system; and
   an optimizer for optimizing select ones of the outputs as a function of the inputs by minimizing an objective function J to provide optimal values for select ones of the inputs;
   said optimizer including a plurality of models of the system, each model operable to map the inputs through a representation of the system to provide predicted outputs corresponding to the select ones of the outputs, each of the models for predicting the select ones of the outputs of the system, which predicted outputs of said plurality of models are combined in accordance with a predetermined combination algorithm to provide a single predicted output corresponding to each of the select ones of the outputs.

42. The optimizing system of claim 41, wherein the optimal value of the predicted outputs of said plurality of models is determined as a single averaged optimal predicted output value for each of the select ones of the outputs.

43. The optimizing system of claim 41, and further comprising a control system for applying the optimal values of the select ones of the inputs to the corresponding inputs of the system after determination thereof.

44. The optimizing system of claim 41, wherein the input is operable to receive measurable outputs of the system.

45. The optimizing system of claim 41, wherein said optimizer comprises a derivative-based optimization operation.

46. The optimizing system of claim 45, wherein said optimizer includes:
   means for determining the average predicted output of the plurality of models <y(t)>;
   means for determining the average derivative of the average predicted output <y(t)> with regards to the inputs x(t) as $\partial \langle y(t) \rangle / \partial x(t)$;
   the objective function J being a function of <y(t)> and means for determining a derivative of the objective function J with respect to <y(t)> as $\partial J / \partial \langle y(t) \rangle$;
   means for determining with the chain rule the relationship $\partial J / \partial x(t)$; and
   means for determining the minimum of the J.

47. The optimizing system of claim 46, wherein the average derivative of the average predicted output is weighted over said plurality of models.

48. The optimizing system of claim 41, wherein said plurality of models of the pin system are operable to predict the predicted outputs corresponding to the select ones of the outputs to a point forward in time as a trajectory.

49. An optimizing system for optimizing the parameters of a system having a vector input x(t) and a vector output y(t), comprising:
   a plurality of models of the system, each for storing a representation of the system, each of said models operable to predict the output as a predicted vector output of the system for a given input value of x(t), each model operable to map the inputs x(t) through a representation of the system to provide a predicted output vector corresponding to the vector output y(t); and
   an optimizer for determining a single optimized input vector value $\hat{x}(t)$ by applying a predetermined optimization algorithm to the plurality of models to achieve a minimum error to a predetermined optimization objective for the predicted output vectors for each of the models.

50. The optimizing system of claim 49, wherein said optimizer is operable to determine the derivative $\partial y(t)/\partial x(t)$ of each of said plurality of models and then determining an average of the derivatives $\partial y(t)/\partial x(t)$.

51. The optimizing system of claim 49, wherein said optimizer is operable to determine the weighted average of the derivatives $\partial y(t)/\partial x(t)$.

52. The optimizing system of claim 51, wherein said optimizer determines the weighted average of the derivatives derivative by following relationship:

$$\frac{\partial \langle \vec{y}_q \rangle}{\partial \vec{x}_p(t)}(\vec{x}(t)) \propto \sum_{w=1}^{N_w} \frac{\partial \langle \vec{y}_q \rangle(t)}{\partial \vec{x}_p(t)} \vec{x}(t) \prod_{i=1}^{n} P(\vec{y}^{(i)} | \vec{x}^{(i)}, \vec{\omega}) P(\vec{\omega})$$

where $$\prod_{i=1}^{n} P(\vec{y}^{(i)} | \vec{x}^{(i)}, \vec{\omega})$$

is the likelihood, P(ω) is a prior distribution of the parameters ω of said associated one of said models, and their product is the posterior distribution.

53. The optimizing system of claim 49, wherein each of said plurality of models comprises a non-linear or linear network, each operable to map the input x(t) to a predicted output through a stored representation of the system.

54. The optimizing system of claim 53, wherein the stored representation of the system in each of said plurality of non-linear or linear networks are related in such a manner wherein the parameters of each of said linear or non-linear networks are stochastically related to each other.

55. The optimizing system of claim 54, wherein the stochastic relationship is a Bayesian relationship.

56. The optimizing system of claim 49, wherein the predetermined optimization algorithm is an iterative optimization algorithm.

57. The optimizing system of claim 49, wherein said optimizer is operable to determine the derivative of the predetermined optimization objective relative to the input vector x(t) as $\partial J/\partial x(t)$, where J represents the predetermined optimization objective.

58. The optimizing system of claim 49, wherein said optimizer is operable to determine the derivative $\partial y(t)/\partial x(t)$ of each of said models and then determine an average of the derivatives $\partial y(t)/\partial x(t)$.

59. The optimizing system of claim 58, wherein said optimizer determines the average derivative over a (q, p) matrix by the following relationship:

$$\frac{\partial \langle \vec{y}_q \rangle}{\partial \vec{x}_p(t)}(\vec{x}(t)) \propto \sum_{w=1}^{N_w} \frac{\partial \langle \vec{y}_q \rangle(t)}{\partial \vec{x}_p(t)} \vec{x}(t) \prod_{i=1}^{n} P(y^{(i)} | x^{(i)}, \omega) P(\omega)$$

where $$\prod_{i=1}^{n} P(y^{(i)} | x^{(i)}, \omega)$$

is the likelihood, $P(\omega)$ is a prior distribution of the parameters $\omega$ of each of said models, and their product is the posterior distribution.

60. The optimizing system of claim 59, wherein the said optimizer determines $\partial J/\partial \langle x(t) \rangle$ with:
means for determining the weighted average of the predicted output of each of said models by the following relationship:

$$\langle \vec{y}(t) \rangle \propto \sum_{w=1}^{N_w} F^{(w)}(\vec{x}) \prod_{i=1}^{n} P(y^{(i)} | x^{(i)}, \omega) P(\omega)$$

where $P(y^{(i)}|x^{(i)},\omega)P(\omega)$ represents the posterior probability of said each model indexed by w, and $N_w$ represents the maximum number of said models in the stochastic relationship, and wherein said stored representation of the system in each of said plurality of models are related in such a manner wherein the parameters of each of said models are stochastically related to each other;
means for determining the derivatives $\partial J/\partial \langle y(t) \rangle$ as the variation of the predetermined optimization objective with respect to the output y(t); and
means for determining by the chain rule the following:

$$\frac{\partial J}{\partial \vec{x}_p(t)}\bigg|_p = \sum_q \frac{\partial J}{\partial \langle \vec{y}_q(t) \rangle} \frac{\partial \langle \vec{y}_q(t) \rangle}{\partial \vec{x}(t)_p}.$$

61. An optimizing system for determining the dynamic operation of a system, comprising the steps of:
an input for receiving the outputs of the system and the measurable inputs to the system; and
an optimizer for optimizing select ones of the outputs as a function of the inputs over a future horizon by minimizing an objective function J to achieve a predetermined desired setpoint to provide optimal values for select ones of the inputs over a trajectory to the desired setpoint in incremental time intervals;
said optimizer operable to predicting the select ones of the outputs over the trajectory at each of the incremental time intervals from the current value to the setpoint with a plurality of models of the system, which predicted outputs of said plurality of models are combined in accordance with a predetermined combination algorithm to provide a single predicted output corresponding to each of the select ones of the outputs.

62. The optimizing system of claim 61, wherein the optimal value of the predicted outputs of said plurality of models is determined by said optimizer as a single averaged optimal predicted output value for each of the select ones of the outputs at each of the incremental time intervals from the current value to the setpoint.

63. The optimizing system of claim 61, and further comprising a control system operable for applying the optimal values of the select ones of the inputs for less than the number of incremental time intervals from the current value to the setpoint to the corresponding inputs of the system after determination thereof.

64. The optimizing system of claim 61, wherein said input is operable to receive measurable outputs of the system.

65. The optimizing system of claim 61, wherein said optimizer operates in accordance with a derivative-based optimization operation.

66. The optimizing system of claim 65, wherein the said optimizer includes:
means for determining the average predicted output of said plurality of models $\langle y(t) \rangle$;
means for determining the average derivative of the average predicted output $\langle y(t) \rangle$ with regards to the inputs x(t) as $\partial \langle y(t) \rangle / \partial x(t)$;
the objective function J being a function of $\langle y(t) \rangle$ and means for determining a derivative of the objective function J with respect to $\langle y(t) \rangle$ as $\partial J/\partial \langle y(t) \rangle$;
means for determining with the chain rule the relationship $\partial J/\partial x(t)$; and
means for determining the minimum of the objective function J.

67. The optimizing system of claim 66, wherein the average derivative of the average predicted output is weighted over said plurality of models.

68. An optimizing system for optimizing the parameters of a system having a vector input x(t) and a vector output y(t) and with respect to the dynamic operation thereof from a current operating point to a desired setpoint for the output y(t), comprising:
a plurality of models, each for storing a representation of the system, each of said models operable to predict the output of the system for a given input value of x(t), each model operable to map the vector input x(t) through a representation of the system to provide a predicted output vector corresponding to the vector output y(t); and
an optimizer for determining a single optimized input vector value $\hat{x}(t)$ for each of a plurality of time increments between the current value and the desired setpoint over a future horizon by applying a predetermined optimization algorithm to the plurality of models to achieve a minimum error to a predetermined optimization objective at each of the plurality of time increments between the current value and the desired setpoint over the future horizon.

69. The optimizing system of claim 68, wherein said optimizer is operable to determine the derivative $\partial y(t)/\partial x(t)$ of each of said models and then determine an average of the derivatives $\partial y(t)/\partial x(t)$.

70. The optimizing system of claim 69, wherein said optimizer determines the average of the derivative by determining the weighted average of the derivatives $\partial y(t)/\partial x(t)$.

71. The optimizing system of claim 70, wherein said optimizer determines the average derivative by the following relationship:

$$\frac{\partial \langle \vec{y}_q \rangle}{\partial \vec{x}_p(t)}(\vec{x}(t)) \propto \sum_{w=1}^{N_w} \frac{\partial \vec{y}_q(t)}{\partial \vec{x}_p(t)} \vec{x}(t) \prod_{i=1}^{n} P(\vec{y}^{(i)} | \vec{x}^{(i)}, \vec{\omega}) P(\vec{\omega})$$

where $$\prod_{i=1}^{n} P(y^{(i)} | x^{(i)}, \vec{\omega})$$

is the likelihood, P(ω) is a prior distribution of the parameters ω of each of said models, and their product is the posterior distribution.

72. The optimizing system of claim 69, and further comprising a control system for applying the optimized input values of the select ones of the inputs x̂(t) for less than the number of incremental time intervals from the current value to the setpoint to the corresponding inputs of the system after determination thereof.

73. The optimizing system of claim 68, wherein each of said plurality of models stores a representation of the system in a plurality of non-linear or linear networks, each operable to map the input x(t) to a predicted output through a stored representation of the system.

74. The optimizing system of claim 73, wherein the stored representation of the system in each of said plurality of non-linear or linear networks are related in such a manner wherein the parameters of each of the non-linear or linear networks are stochastically related to each other.

75. The optimizing system of claim 74, wherein the stochastic relationship is a Bayesian relationship.

76. The optimizing system of claim 68, wherein the predetermined optimization algorithm is an iterative optimization algorithm.

77. The optimizing system of claim 68, wherein said optimizer is operable to determine the single optimized input vector value x̂(t) by determining the derivative of the predetermined optimization objective relative to the input vector x(t) as ∂J/∂x(t), where J represents the predetermined optimization objective between the current value and the desired setpoint.

78. The optimizing system of claim 68, wherein said optimizer determines the derivative ∂y(t)/∂x(t) of each of said models and then determines an average of the derivatives ∂y(t)/∂x(t).

79. The optimizing system of claim 78, wherein said optimizer determines the average derivative over a (q, p) matrix by the following relationship:

$$\frac{\partial \langle \vec{y}_q \rangle}{\partial \vec{x}_p(t)}(\vec{x}(t)) \propto \sum_{w=1}^{N_w} \frac{\partial \vec{y}_q(t)}{\partial \vec{x}_p(t)} \vec{x}(t) \prod_{i=1}^{n} P(\vec{y}^{(i)} | \vec{x}^{(i)}, \vec{\omega}) P(\vec{\omega})$$

where $$\prod_{i=1}^{n} P(\vec{y}^{(i)} | \vec{x}^{(i)}, \vec{\omega})$$

is the likelihood, P(ω) is a prior distribution of the parameters ω of each of said model, and their product is the posterior distribution.

80. The optimizing system of claim 79, wherein said optimizer is operable to determine ∂J/∂<∂(t)> with:
  means for determining the weighted average of the predicted outputs of each of said models at each of the increments of time by the following relationship:

$$\langle \vec{y}(t) \rangle \propto \sum_{w=1}^{N_w} F^{(w)}(\vec{x}) \prod_{i=1}^{n} P(\vec{y}^{(i)} | \vec{x}^{(i)}, \vec{\omega}) P(\vec{\omega})$$

where P(y$^{(i)}$x$^{(1)}$, $\vec{\omega}$)P($\vec{\omega}$) represents the posterior probability of said associated one of said models indexed by w, and $N_w$ represents the maximum number of said models in the stochastic relationship, and wherein the stored representation of the system in each of said models is related in such a manner wherein the parameters of each of said models are stochastically related to each other;
  means for determining the derivatives ∂J/∂<y(t)> as the variation of the predetermined optimization objective with respect to the predicted output y(t) at each of the plurality of time increments between the current value and the setpoint; and
  means for determining by the chain rule the following:

$$\frac{\partial J}{\partial \vec{x}_p(t)}\bigg|_p = \sum_q \frac{\partial J}{\partial \langle \vec{y}_q(t) \rangle} \frac{\partial \langle \vec{y}_q(t) \rangle}{\partial \vec{x}(t)_p}.$$

\* \* \* \* \*